Nov. 10, 1970 D. L. BENCHER 3,540,000

CRISS-CROSS SORTING METHOD AND MEANS

Filed Nov. 2, 1967 10 Sheets-Sheet 1

INVENTOR
DENNIS L. BENCHER

BY Bernard M. Goldman

ATTORNEY

CRISS-CROSS SORTING METHOD AND MEANS

Filed Nov. 2, 1967

10 Sheets-Sheet 7

United States Patent Office 3,540,000

Patented Nov. 10, 1970

3,540,000

CRISS-CROSS SORTING METHOD AND MEANS

Dennis L. Bencher, Fishkill, N.Y., assignor to International Business Machines Corporation, Armonk, N.Y., a corporation of New York Filed Nov. 2, 1967, Ser. No. 680,260
Int. Cl. G06f 7/06
U.S. Cl. 340—172.5 30 Claims

ABSTRACT OF THE DISCLOSURE

A circuit arrangement for controlling the selection among N number of I/O units. Initial strings are written on $(N-1)$ of these I/O units before these strings are read, merged and written onto the Nth I/O unit. The circuit arrangement causes this operation to be repeated $(N-1)$ times on different I/O units, which results in recording a base level of $(N-1)$ merge strings on $(N-1)$ respective I/O units, wherein each merge string includes $(N-1)$ initial strings.

Then a merge string is written on each of $(N-2)$ of the I/O units, selecting them in reverse order, the Nth unit of the base level contains no string. These $(N-2)$ merge strings are controlled to merge with one of the base level merge strings, resulting in a group-merge string that includes $(N-2)^2$ initial strings being written on the Nth I/O unit. This is repeated $(N-1)$ times and yields a new base level of group-merge strings, each including $(N-1)^2$ initial strings. Continuing in this manner, successive base levels of initial string length $(N-1)^3$, $(N-1)^4$, etc. may be generated and written until an end-of-file is reached. At this point, an $(N-1)$ way merge is performed to write the final output.

This invention relates generally to a sort-by-merge system, and relates particularly to a system using a novel sort-by-merge switching technique that uniquely switches intermediate input/output units.

The subject invention reduces the number of reading and writing operations on input/output extents when compared to prior sort-by-merge switching arrangements, where a very large number of records (or items) and seven or more input/output extents are available for intermediate use in the sort-by-merge operation.

Prior sort-by-merge switching techniques may be summarized under the names of: (1) balanced, (2) cascade, (3) polyphase, and (4) oscillating. These prior sort-by-merge techniques are described in the following references:

(1) Balanced sort-by-merge arrangements are described in U.S. Patent No. 2,913,171 to B. E. Phelps et al., or U.S. Patent No. 2,974,306 to M. E. Femmer et al.

(2) A Polyphase Sort-By-Merge Technique is described in "New Merge Sorting Techniques," by B. K. Betz, and W. C. Carter, 14th Nat. Mt. ACM, Cambridge, Mass., 1959, Paper #14, Preprint.

(3) "Polyphase Merge Sorting—An Advanced Technique," by R. L. Gilstad, Proc. FJCC, 1960, pp. 143–148.

(4) "Read-Backward Polyphase Sorting," by R. L. Gilstad, Comm. ACM (May 1963), pp. 220–223.

(5) "Oscillating Sort—A New Merge Sorting Technique," by S. Sobel, J. ACM 9 (July 1962), pp. 372–374.

(6) "A Comparison Between the Polyphase and Oscillating Sort Techniques," by G. A. Toth and M. A. Goetz, Comm. ACM (May 1963), pp. 223–225.

A balanced merge system was described and claimed at an early date after an internal memory sort in U.S. Patent 2,974,306 (supra) to M. E. Femmer et al.

The subject invention uses a novel criss-cross sorting technique conceived by the subject inventor, and this novel technique is basic to this specification. Although the evaluation of computer sorting techniques for determining which techniques is superior is a very complex task, such evaluation has found that the criss-cross sorting technique is superior to the balanced, cascade and oscillating techniques under most circumstances, and is superior to the polyphase technique when seven or more I/O extents (i.e. separately addressable I/O files) are available for intermediate use during the sorting operation. Under some circumstances, the criss-cross sort is also superior for lesser numbers of I/O extents, such as can be shown by extending an example taken from the 1960 Gilstad paper (supra) which assumes four intermediate input-output units (extents) and an input unit having one-hundred original string of data records. The following table shows the total number of original strings passed (read and written) during the entire merge phase:

| Technique: | Total strings passed |
|---|---|
| Balanced | 700 |
| Cascade | 600 |
| Oscillating | 498 |
| Polyphase | 469 |
| Criss-Cross | 444 |

Sort-by-merge using switched I/O devices is an *external* computer sorting technique which supplements an *internal* computer sorting technique, which does all sorting within the memory of the computer.

The trend is also toward larger and larger data files. It appears the size of data files is increasing at a faster pace than the size of memories for computer systems, even though computer memory size is increasing at a fast pace. Accordingly efficiency in *external* computer sorting techniques becomes of ever increasing importance.

In any modern computer system, *internal* sorting is invariably faster than *external* sorting, since internal memory and CPU rates are faster than I/O transfer rates involving I/O switching operations. Accordingly *internal* sorting is almost always maximized as a prerequisite to *external* sorting, in order to internally generate string sequences as long as possible. Once internal sequences of maximum length are outputted from a computer, the *internal* sort is no longer available to complete the sorting operation, since the internally sorted sequences have used the maximum internal capacity of the system. Thereafter the sorting operation is completely dependent upon some external sort-by-merge technique that must switch I/O devices.

The subject invention is directed toward a novel technique for increasing the efficiency of a computer system by reducing the amount of system switching, and the time needed to complete a given external sort. This technique is represented in a novel algorithm which is implemented herein by special AND and OR circuitry. This invention thus efficiently switches external devices during its unique sort-by-merge operation, preferably after the computer system has sorted input records into maximum internal length strings by any type of conventionally programmed internal sorting technique, such as by the replacement selection sort, insertion sort, internal sort-by-merge, shifting sort, inversion sort, decimal sort, etc.

The subject invention requires a number of separately-addressable I/O files or devices (extents), designated as N number of I/O extents, which are available for use as Intermediate Units in the sort-by-merge operations. Such N extents are addressed in a particular sequence for the purpose of control in the invention. A Criss-Cross Sort begins by writing an "initial string" on each of $(N-1)$ extents. Then these "initial strings" are merged as a single "merge string" onto the remaining Nth extent. This operation resulting in writing a "merge string" is repeated $(N-1)$ number of times on $(N-1)$ different extents, with the Nth extent remaining without any "merge string" written upon it. An Alpha operation is then started in which "initial strings" are again written on $(N-1)$ extents resulting in a "merge string" written on the Nth extent. This manner of generating a "merge string" is then repeated until a second "merge string" is written on $(N-2)$ extents. This $(N-2)$ "merge string" operation may be described as an Alpha switching system.

An "initial string" is preferably always written as the output of an internal sort operation; but the "merge string" is always an external sorting operation. The "merge string" is the lowest order sort-by-merge operation used by this invention. Any "initial string" may be erased (or otherwise disregarded) after it is read during a merge, which writes its records on another unit that is receiving the merge.

After the Alpha operation, the remaining two extents are the Nth extent which does not have any "merge string," and the Ith extent, which is one of the extents adjacent to the Nth extent that has its highest-level "merge string" at the next lower level.

After the Alpha arrangement is completed, an input/output selector indicates the Ith extent.

The first $(N-1)$ number of "merge strings" may be defined as being at zero level; while the next $(N-2)$ "merge strings" may be described as being at first level, since those $(N-2)$ extents each have a second string written upon them.

A machine "test" is then made which compares each of $(N-2)$ "merge strings" written at the highest (current) level with "merge string" written on the Ith extent at the next lower level. The comparison is based on the number of the recorded "initial strings" contained in each compared "merge string."

If the "test" finds any inequality, or if the current level is zero, the operation of writing "initial strings" and combining them into $(N-2)$ "merge strings" is repeated until the "test" finds an equality situation.

If the machine "test" finds equality existing between the Ith "lower-level merge string" and each "higher level merge string," then all compared "merge strings" are merged into a single "group merge string" on another extent which has no string at the levels of the compared strings. A Merge Direction Switch determines extent on which the "group-merge string" is written in relation to the extent having the lower level compared "merge string." The first "group merge string" is written on an extent not having any "merge string."

The Merge Direction Switch is preferably turned off before writing "initial strings." It is set to respectively opposite states when it has written "group merge strings" on respectively opposite sides of the Ith "lower-level merge string" during a preceding machine "test."

After writing any "group merge string" on either adjacent extent, the machine "test" is repeated to determine whether another "initial string" should be written by an Alpha operation, or whether a "group merge string" should be written by a Beta or Gamma operation on the extent determined by the Merge Direction Switch as previously stated.

The novel method and means for executing a criss-cross sort may be represented by the following algorithm:

BEGIN

Let

I=Output setting of a first counter indicating selected one of IU–0 through IU–M.

J=Output of second counter indicating selected one of IU–0 through IU–M.

N=Number of I/O entities used.

M=N−1.

Set I at a starting position.

```
--------------→--------------→Write an initial-string on unit (I).
 Do M Times..   Do M Times.I=I+1.
------------------------------Merge from all units which have strings
                                at this level onto unit (I). [This pro-
                                vides a merge-string on unit I at zero
                                level.]
--------------→--------------→Write an initial-string on unit (I).
 Do M−1         Do M Times.I=I−1.
   Times.
------------------------------Merge from all units which have initial
                                strings onto unit (I).
```

ALPHA

Turn OFF Direction Switch.

Set counter J=counter I.

mapped. In step H the address is moved to the exit field

GO TO MACHINE-TEST.

MACHINE-TEST

If at lowest possible level, $I=I+1$ and GO TO ALPHA.

Compare $(N-2)$ non-zero "merge strings" at current level with "merge strings" at the next lower level on unit I for equality in "initial string" number. If any comparison is not equal, $I=I+1$, and GO TO ALPHA.

If all comparisons are equal, and Direction Switch is OFF, GO to BETA.

If all comparisons are equal, and Direction Switch is ON, GO TO GAMMA.

BETA

Merge all compared strings onto unit $(I-1)$. Turn ON Direction Switch, and GO TO MACHINE-TEST.

GAMMA

Merge all compared strings onto unit $(I+1)$.

Turn OFF Direction Switch, and GO TO MACHINE-TEST.

The foregoing and other objects, features and advantages of the invention will be apparent from the following more particular description of the preferred embodiment of the invention illustrated in the accompanying drawings of which:

Figure 3A:
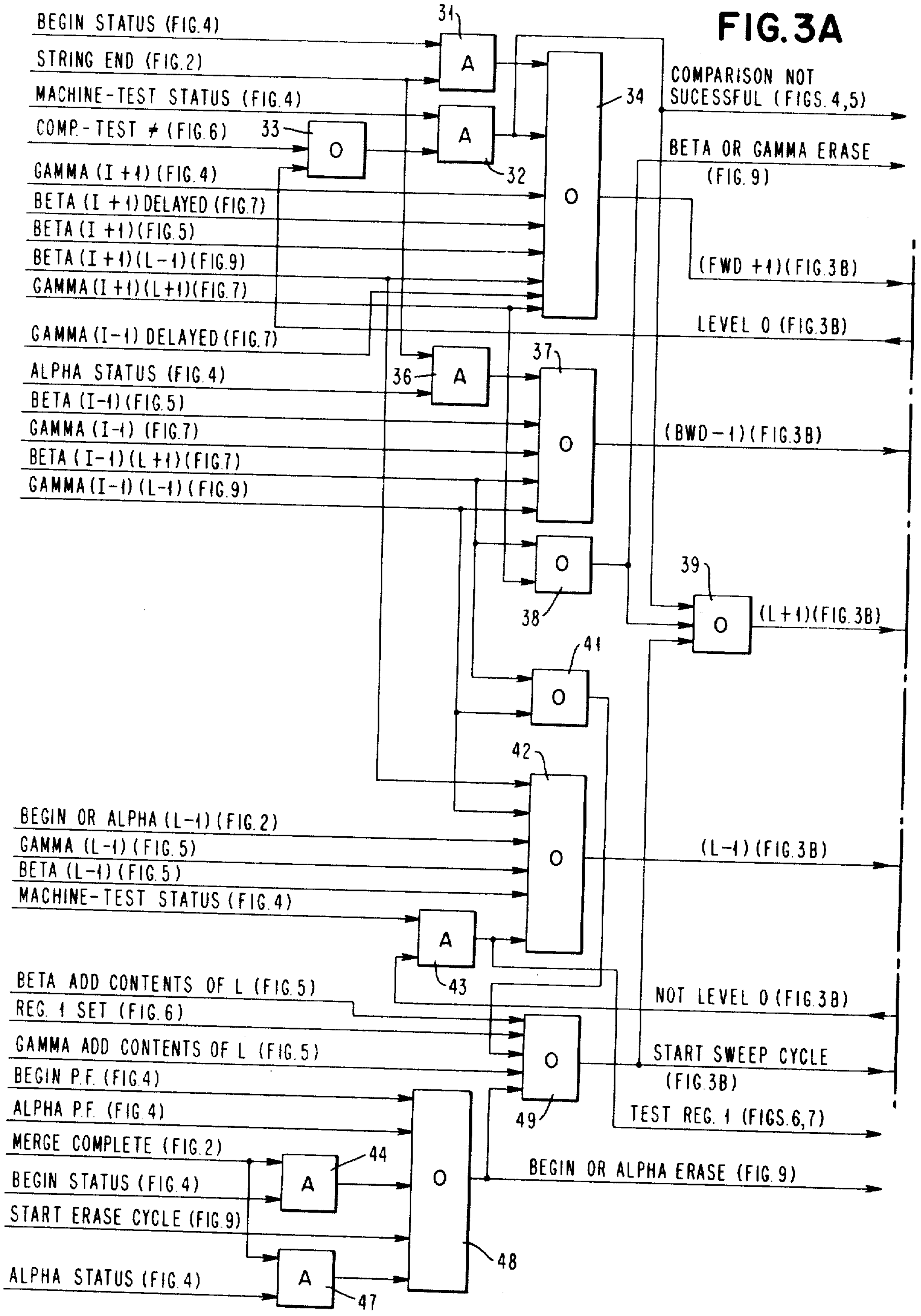
Figure 4:
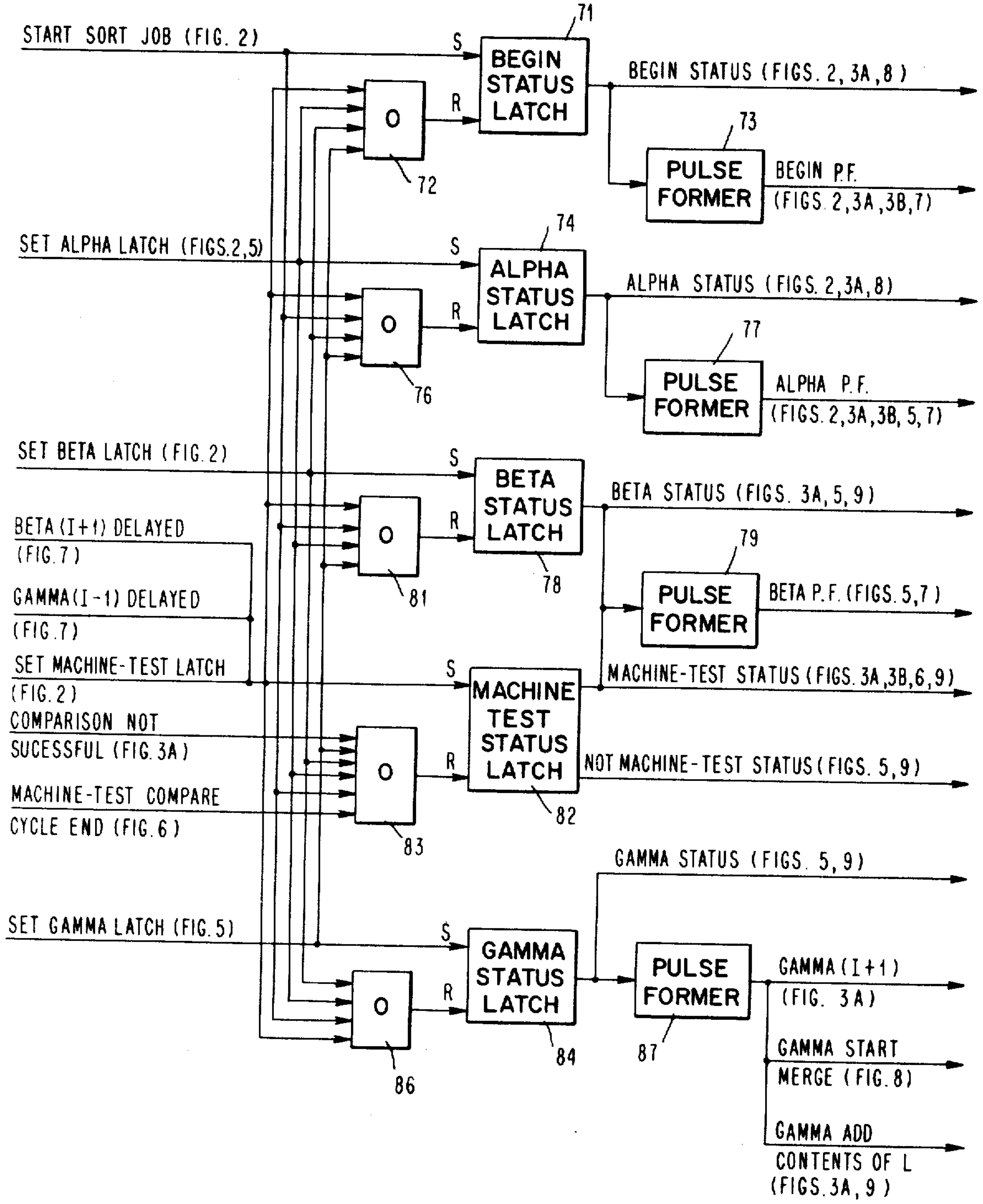
Figure 5:
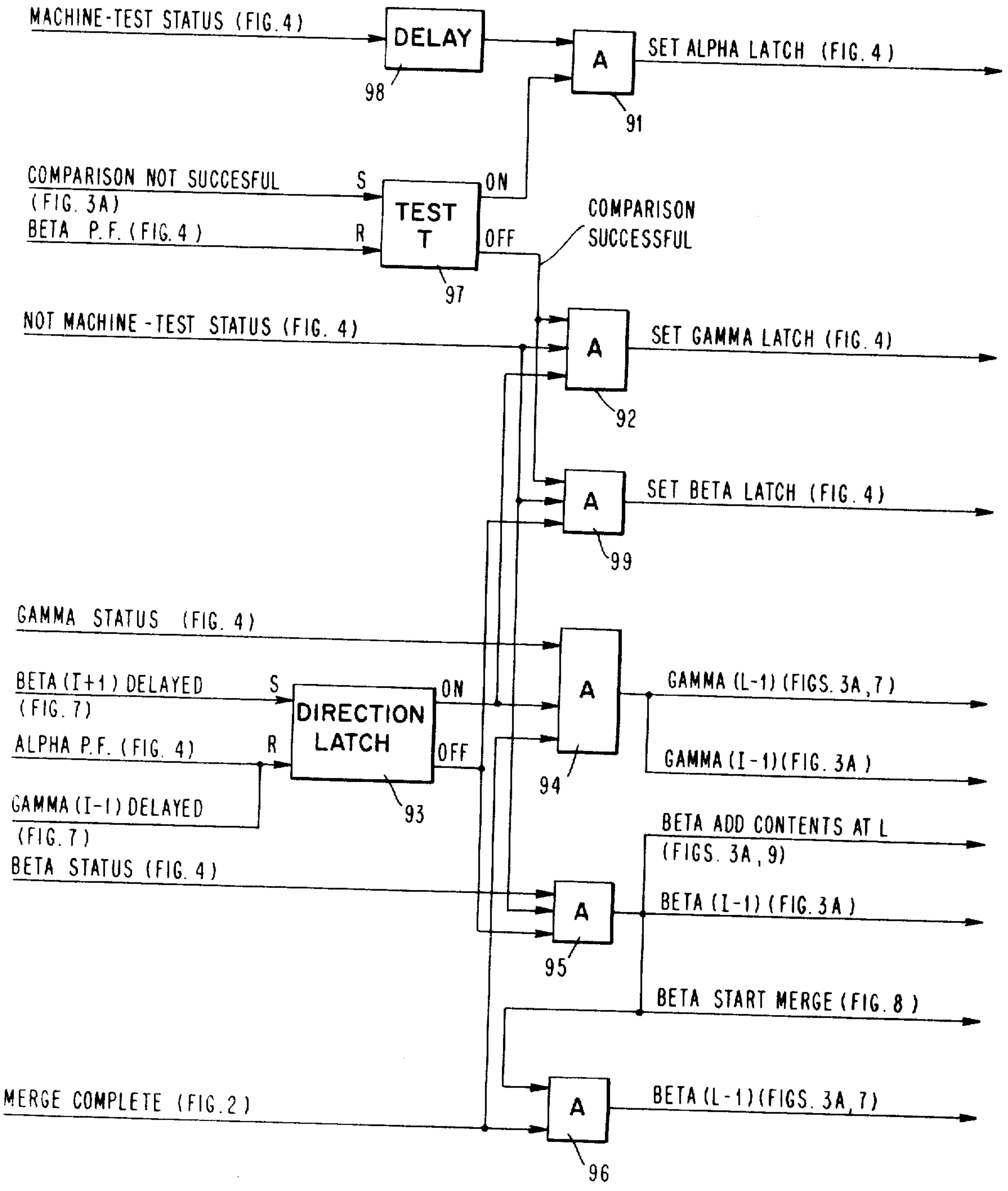
Figure 6:
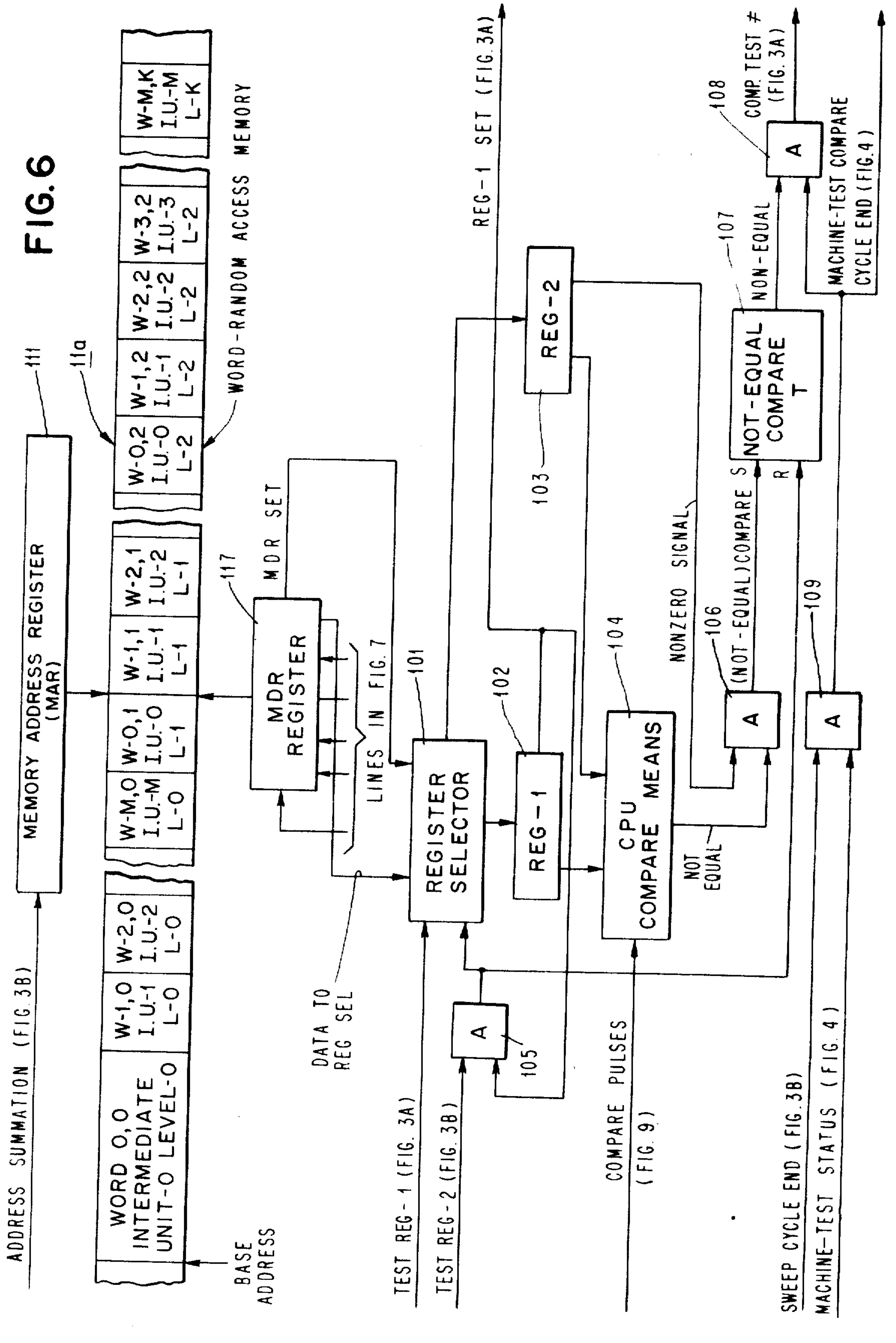
Figure 7:
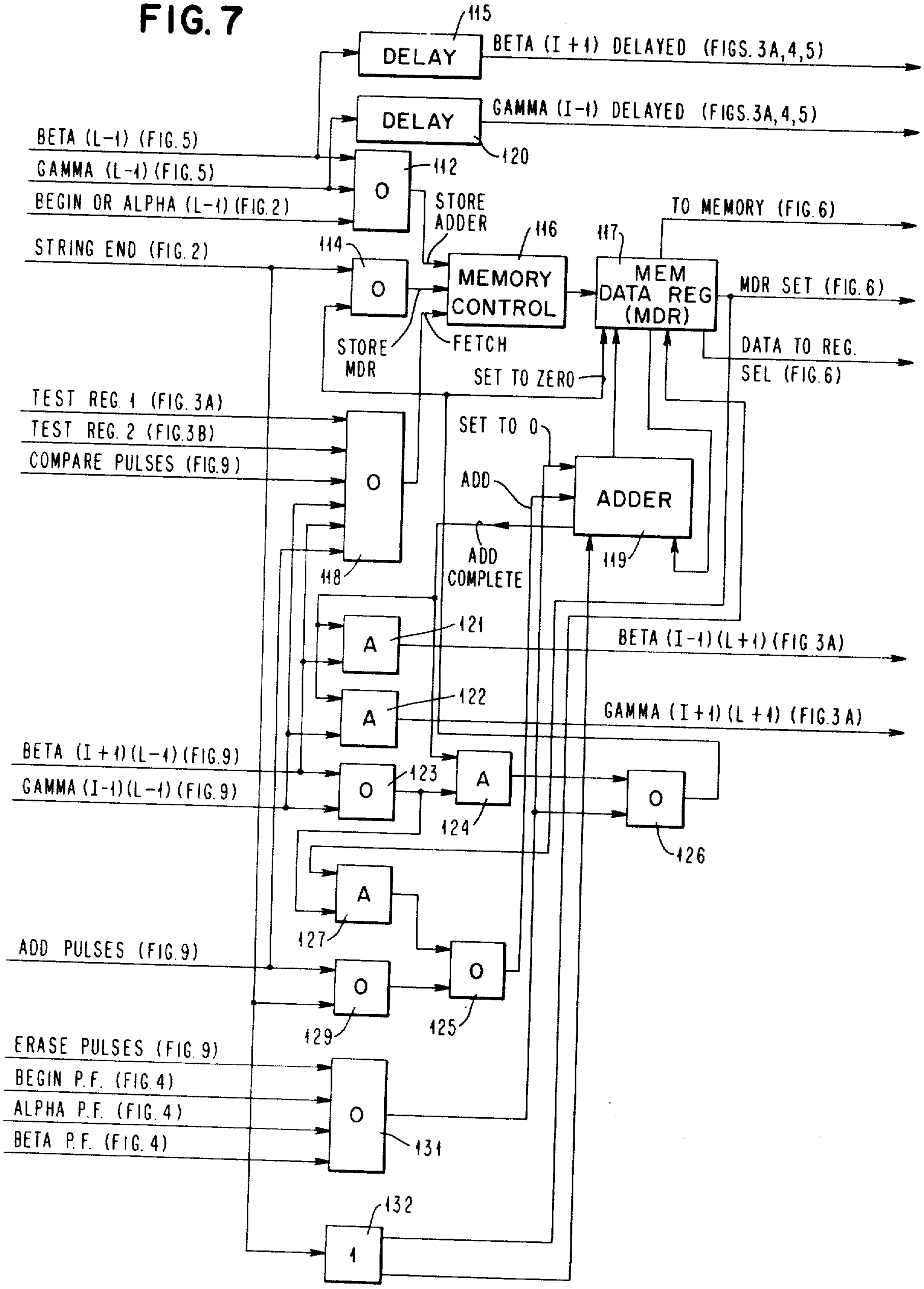
Figure 8:
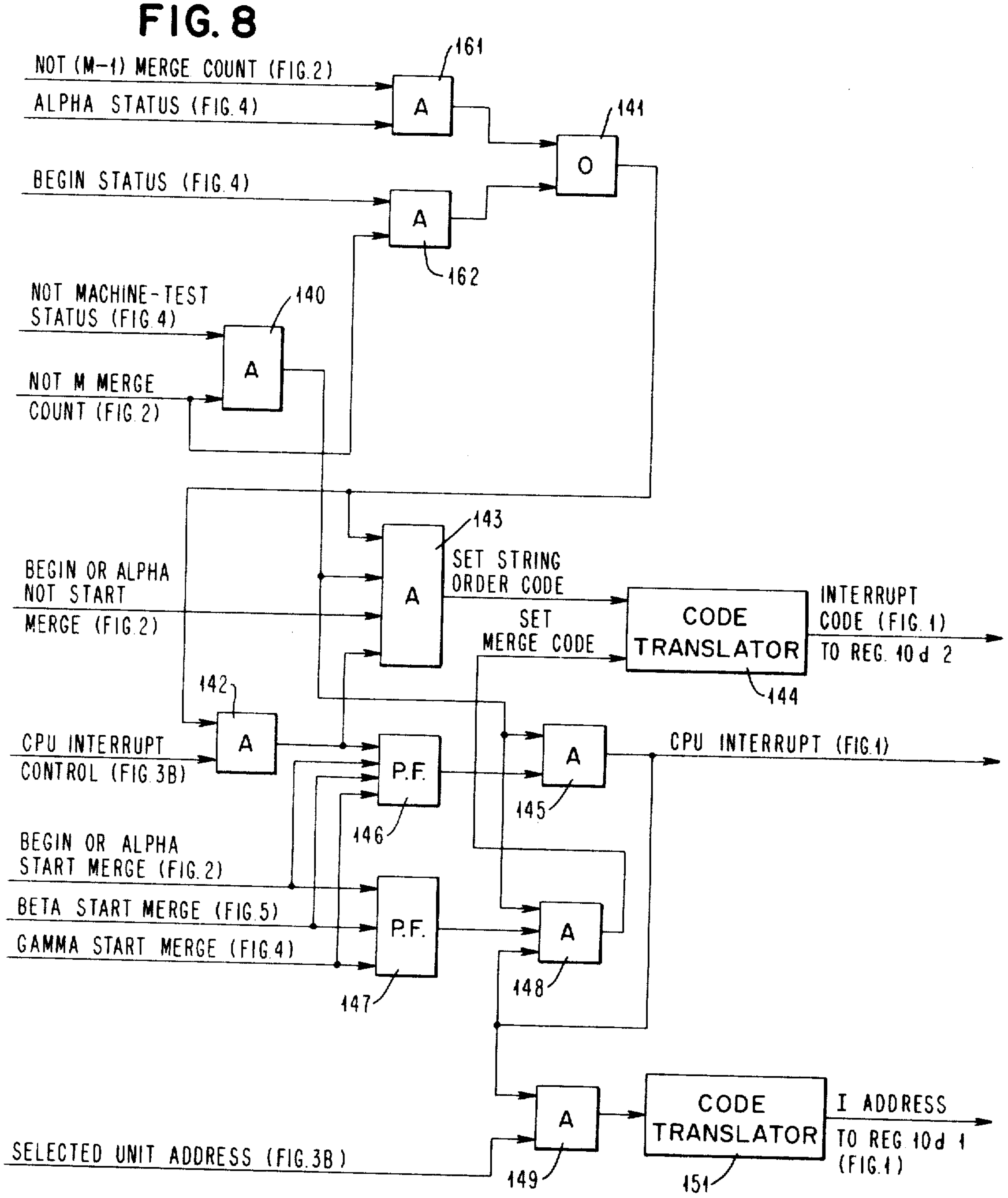
Figure 9:
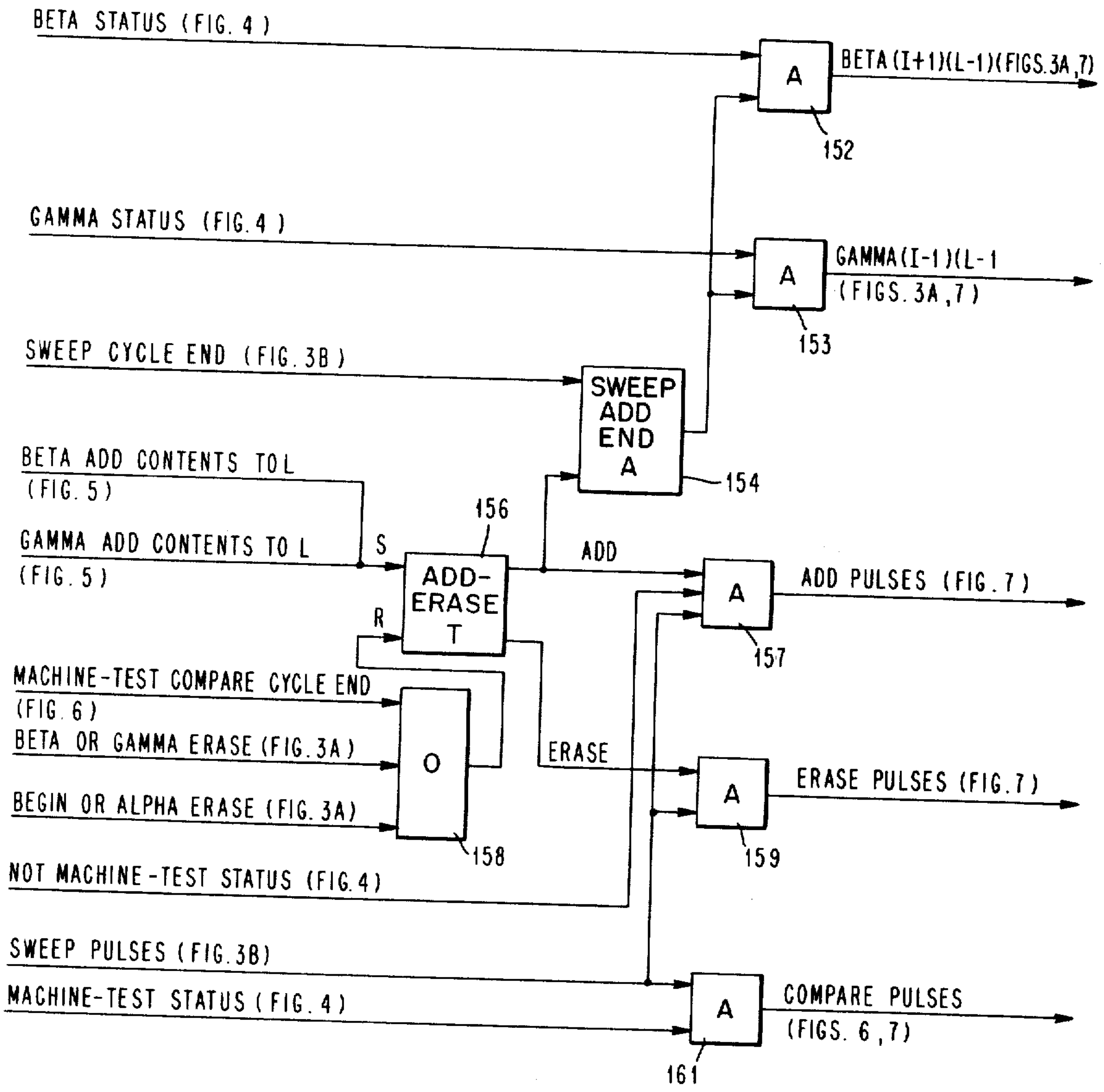

FIGS. 3A and B illustrate circuitry for controlling the address inexing and summation used by the embodiment;

FIG. 4 shows circuits used to control the different types of status required by the embodiment;

FIG. 5 illustrates circuitry for determining branching between Beta and Gamma status in the embodiment;

FIG. 6 shows a comparator system usable during a Machine-Test operation;

FIG. 7 represents circuitry for controlling the posting to memory required for control of certain operations in the embodiment;

FIG. 8 represents circuitry used to transfer control from the subject embodiment to conventional computer operation;

FIG. 9 shows circuitry for controlling sweep posting operations.

Figure 1:
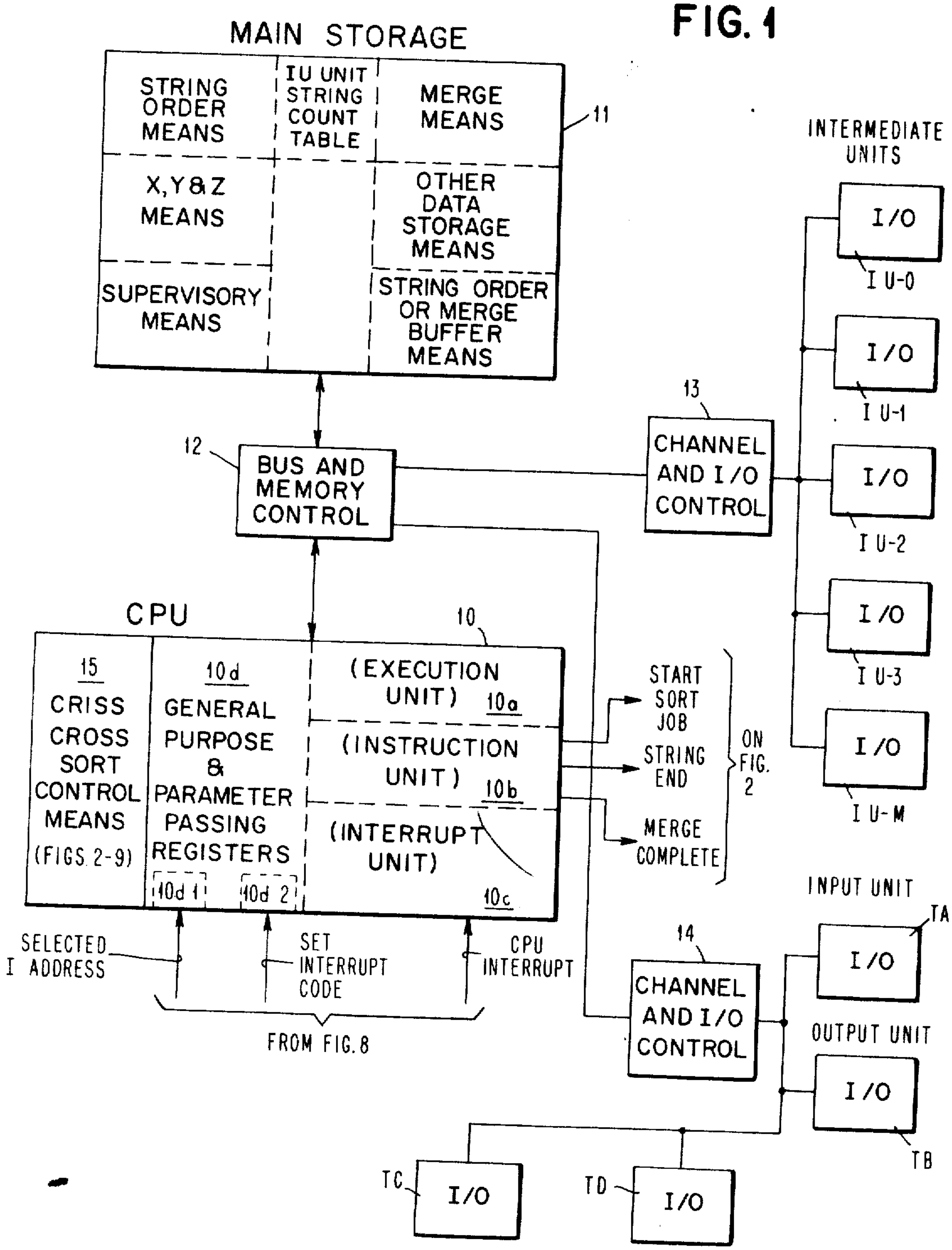
FIG. 1 represents a computer system which includes the subject invention.

The subject invention is represented in FIG. 1 by a Criss-Cross Sort Control means 15, which is shown as attached to the CPU part of a computer system that may otherwise be a commercially-available computer system, such as most IBM System/360.

The invention controls the computer system to sort a plurality of records (or data items) provided to the computer from an input/output (I/O) unit TA. The same records (or items) can be finally provided in a sorted order to an output unit TB. Each shown I/O unit represents an I/O extent, which is a separately addressable I/O recordable data area reserved for a set of data. The I/O units in FIG. 1 may be disk drives, disk drive volumes or tracks, tape units, card read/punches, or any combination or part thereof. In the described embodiment, the I/O units may be considered either tape units or disk drive units.

A plurality of Intermediate I/O Units IU-0 through IU-M are provided operationally between input unit TA and output unit TB. That is, the records provided to the computer from input unit TA are thereafter intermediately switched to and among I/O units IU-0 through IU-M in a novel manner by control means 15. This novel switching of records among Intermediate Units is accomplished by the subject invention in a manner that requires less computer data transfer and therefore less system time than other computer methods for sorting a large number of records when more than four Intermediate Units are available.

The non-unique hardware items in FIG. 1 include CPU units 10*a*, 10*b*, 10*c*, and 10*d*, Main Storage 11, Bus and Memory Control 12, Channels 13 and 14, and the I/O units IU-0 through IU-M and TA, TB, TC and TD. CPU 10 is comprised of Execution Unit 10*a*, Instruction Unit 10*b*, an Interrupt Unit 10*c*, and General Purpose and/or Parameter Passing Registers 10*d* which include Registers 10*d*1 and 10*d*2 among others.

Main Storage 11 may be the core memory of an IBM S/360 computer into which is loaded a number of programs designated as Supervisory Means, String Order Means, Merge Means, and X, Y and Z Means, which need not be unique within the environment of this invention. Data buffer areas are also provided in Memory 11, designated as IU String Count Table, String Order or Merge Buffer Means, and Other Data Storage Means.

The described embodiment permits the subject invention to operate within a multiprogrammed environment, which may be controlled by the Supervisory means, such as the presently available IBM Operating System/360 program called MFT (Multiprogramming with a Fixed number of Tasks). It allows the computer system to operate more efficiently when waiting for I/O or other non-CPU operations to be completed. During such wait periods, the Supervisory Means can switch the CPU to execute part of another program, such as any one of X, Y or Z means which may use I/O units TC and/or TD.

This invention operates the String Order Means in the conventional manner of an ordering program, which causes records from I/O unit TA to be read into the String Order or Merge Buffer means, and causes those records to be written as a string onto a selected I/O unit. Thus any available string ordering program may suffice as the String Order Means. This invention also operates the Merge Means in the conventional manner of a merge program, which can cause a plurality of strings to be read from respective I/O extents into the String Order or Merge Buffer Means, and from which they are merged into a single string as they are read out to another I/O unit. The means disclosed in prior U.S. Pat. No. 2,974,306 to M. E. Femmer et al. (assigned to the same assignee as the subject invention), may be used to provide the String Order Means and Merge means used with this invention. Also a single means that generates strings by a merge operation could be used for both the String Ordering and the Merge Means in the subject invention, such as disclosed in prior U.S. Pat. No. 2,913,171 to B. E. Phelps et al. (assigned to the same assignee as the subject invention). The form of String Order means and Merge Means most commonly used in present day computers is presumed to be used in the disclosed embodiment in which the String Order Means can be any available string ordering program, and the Merge Means can likewise be any available Merge program in which both are represented by the magnetic states of addressable cores in Main Memory 11. Such programs have been available for several years for most commercially used computers; and they may use, for example, any of many different sequencing techniques, such as binary insertion, replacement selection, ordering by merge, etc.

The records are ordered by a "control field" or "key" within each record, which is usually defined at specified character locations within or attached with each record.

The "string" and "string break" concepts are important in sorting terminology. These terms are defined on page 178 of "Computer Dictionary" by C. J. Sippl published in 1966. In summary, a string is a group of records arranged in an ascending or descending sequence by control field. A string may have any number of records including 1 or greater.

A "string break" is the non-sequenced relationship which occurs at the boundary between two strings; it is a "step-down break" between ascending strings and it is a "step-up break" between descending strings. In any unordered grouping of records, strings may be delineated by detecting the "sequence breaks" which bound the strings.

The delineating and sorting of strings of records is described in detail in U.S. Pat. No. 2,974,306 (supra). For example, in that patent (see Columns 57–62) which describe how step-down sequence breaks are detected, wherein a step-down is indicated by a pulse at an exit hub to delineate the end of one string and the beginning of the next string as records are being read from tape. Furthermore, Sort Merge Means for performing that operation is described in columns 62 through 72 of Pat. No. 2,974,-306 (supra).

BASIC COMPONENTS

Figure 3B:
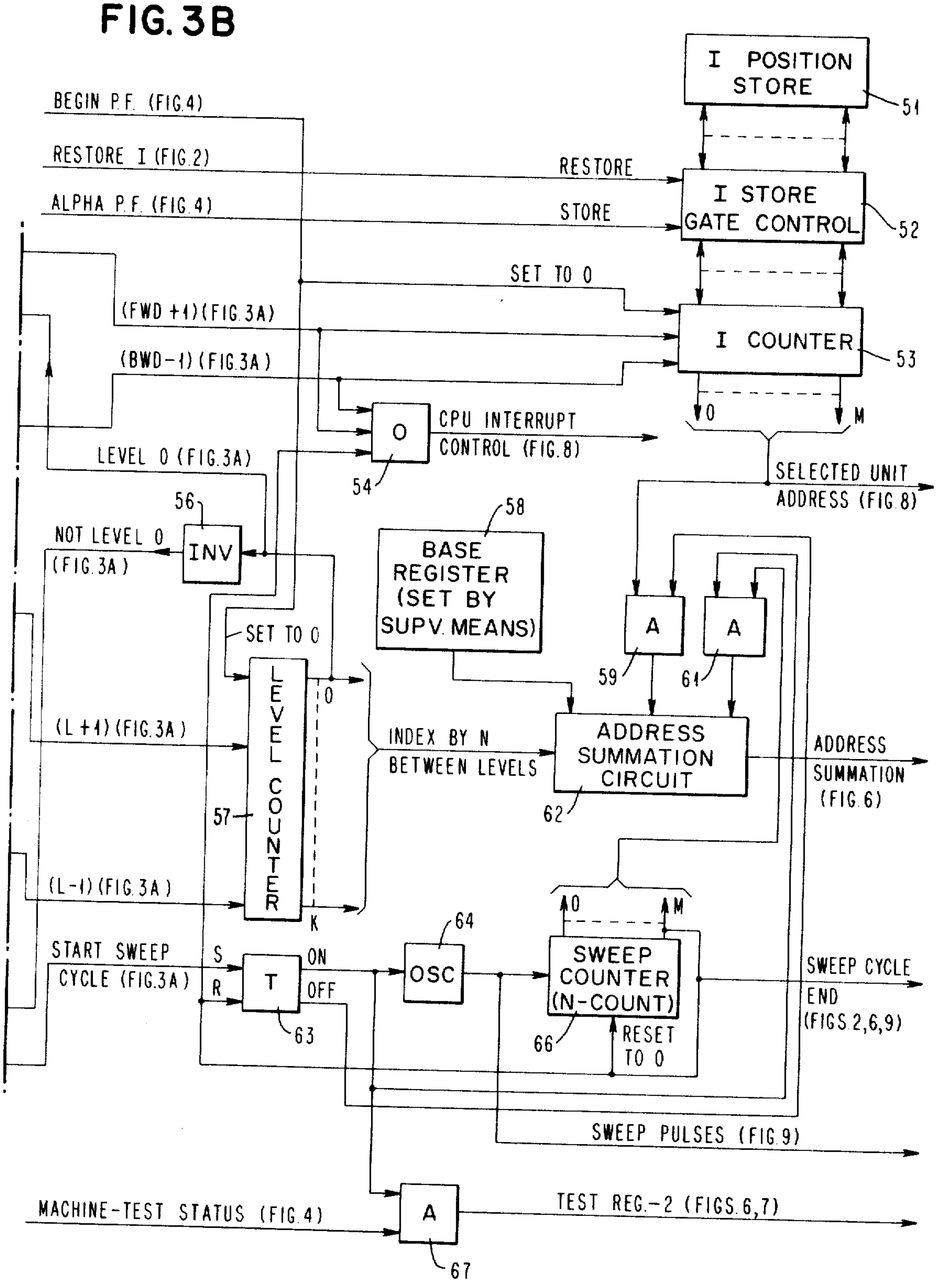

An initial understanding of basic component circuits within Criss-Cross Sort Control means 15 should lead to an easier understanding of the other circuits within means 15. The basic components are shown in FIG. 3B as I counter 53. Level counter 57, and Address Summation circuit 62. The I counter 53 controls the selection of Intermediate Units, and the Level counter 57 defines generally the string location being used on an Intermediate Unit at a particular time during a Criss-Cross sort operation.

The selection and switching of the Intermediate Units IU-0 through IU-M are directly controlled by the output of I counter 53. This is done by its Select Unit Address line to FIG. 8 where a translator 151 encodes each output position of the I counter into an IU address that represents a selected one of IU-0 through IU-M. For example if the IU's are tape units, each counter position causes a different intermediate unit address from translator 151, wherein the sequential counter settings need not generate sequential or contiguous output addresses. Translator 151 is activated only in response to a CPU interrupt signal, after which the selected I/O unit may be operated. This permits the described Criss-Cross sort to link to any other operation which is to be performed by a modern computer system in a multiprogrammed environment. For this purpose, the selected IU address from translator 151 is sent to a Parameter Passing Register 10*d*1 in the CPU of FIG. 1, where it is temporarily stored until the Supervisory Means of the computer system is ready to call into use the selected IU. Whenever any intervening programmed activity is completed by the computer, it links back to the Criss-Cross Sort Control means 15 by means of a String End signal, or Merge Complete signal which is provided from CPU Instruction Unit 10*b*. The String End signal is a pulse brought up by a "string break" when the CPU senses the end of a string while executing the String Order Means. The Merge Complete signal is brought up by the Merge Means when a merge operation has ended for a plurality of strings being merged. The String End signal and Merge Complete signal also are provided by hubs in Femmer et al. Pat. No. 2,974,306, but in a more modern computer there are signals generated by decoding a particular stored CPU instruction such as an SVC instruction placed at the end of a string order program or at the end of a merge program respectively.

In order to maintain control of the Criss-Cross sorting operation, it is necessary to keep track of the location of each initial string of records transmitted under control of the String Order Means to each Intermediate Unit. This is done in the IU String Count Table maintained in an area of Main Memory 11 shown in FIG. 1. This table is represented in more detail in FIG. 6 which shows this part of Main Memory 11, wherein the table starts at a conventional Base Address which may be relocatably selected in the usual manner by the Supervisory Means. The table comprises K number of Levels (L) corresponding to the number of outputs of counter 57 in FIG. 3. Each level in the table has N number of words, with each word assigned to a different IU in sequence IU–0 through IU–M. Hence the number of words in the table is equal to N multiplied by K. Each word in the table will have posted to it the number of "initial strings" existing in the string located on the respective IU at that level. Thus each word in the table may be designated by a two-dimensional array identifier *n, k* in which the first digit represents the IU and the second digit represents the level L for that word. For example, there are N words at level 0 respectively representing the every IU, there are another N words at level one respectively representing the same group of IU's, and so on through the last level K which likewise has N number of words respectively representing the number of "initial strings" at that level written on each IU–OM respectively.

Thus Level counter 57 in FIG. 3B indicates the current level L being addressed in the table on FIG. 6 during Criss-Cross sort operation.

The number of non-zero levels for a given IU represents the number of strips existing on that IU at that time.

An Address Summation circuit 62 in FIG. 3B outputs the current address being used in the table in FIG. 6. This current address is supplied to a Memory Address Register (MAR) 111 shown in FIG. 6, which can address any word in Main Memory 11, including any word in the IU String Count Table. MAR 111 is contained within Bus and Memory Control 12 in FIG. 1.

The address outputted by circuit 62 is a summation of a plurality of address components of which a Base Register 58 provides a Base Address component. This Base Address component is conventional in present IBM S/360 computers, and it may be selected under control of a Supervisory program to enable the table to be located at any conventient place within Main Memory 11. The Base Address output from resistor 58 may remain constant throughout the operation of the embodiment discussed herein. Base register 58 may be of general register within CPU section 10*d* in FIG. 1.

Level counter 57 and I counter 53 each provide address components to Summation circuit 62. Level counter 57, I counter 53, and every other counter in this embodiment may be a ring counter, binary counter, or a programmed counter. Thus each time counter 57 is incremented or decremented by a signal signal, it causes Memory Address Register 111 to address the next higher or lower level of words, respectively. And each time I counteer 53 is incremented or decremented, it causes MAR 111 to address a particular word within the level of words being currently addressed by L counter 57.

A sweep counter 66 provides an output that can select every word sequentially at the level currently addressed by counter 57. Counter 66 is used when the operation requires a posting to every word at the currently addressed level. When used, the output from sweep counter 66 is substituted in the address summation for the output from the I counter 53. Gate arrays 59 and 61 alternatively select between the outputs of counters 53 and 66, wherein gate 59 normally is enabled to pass the output of I counter 53 to the summation circuit. AND array 61 is enabled while AND array 59 is disabled during an add or an erase sweep posting operation to the String Count Table. (An AND gate array is defined as a plurality of identical AND gates which operate at different bit positions in a word. For example, a separate AND gate is needed for each of the outputs 0–M in each array 59 and 61. An array is represented in the specification by a single circuit for simplicity since the use of gating and circuit arrays is common to those skilled in the art.)

Criss-Cross sort means 15 in FIG. 1 is represented by the circuits shown in FIGS. 2–9. The operation of these Criss-Cross sort circuits can precisely be summarized by the following algorithm:

ALGORITHM

Let

I=Output of I counter 53

L=Output of Level Counter 57

N=number of Intermediate Units used

M=$N-1$ (merge order)

D=switch used with I to determine I/O unit that will receive a group-merge.

TABLE

| | | | Statement Number |
|---|---|---|---|
| BEGIN | | Set I=0, and L=0 | 1 |
| | | → L=L+1 | 1(a) |
| | | Erase words O, L through M, L | 1(b) |
| | | → Write a string on unit I | 2 |
| 4(d) Do | 3(a) Do | | |
| Merge | String | String End | 2(a) |
| M Times | M Times | Post 1 to word I, L; and add 1 to adder | 2(b) |
| | | I=I+1 (Forward step I counter) | 3 |
| | | Start merge on Unit I from other units which have strings at level L | 4 |
| | | Merge complete on Unit I | 4(a) |
| | | L=L−1 | 4(b) |
| | | Post adder contents to word I, L for "merge string count" | 4(c) |
| | | L=L+1 | 4(e) |
| | | Erase words O, L through M, L | 4(f) |
| ALPHA | | Store I | 5 |
| | | Turn OFF Merge Direction Switch | 6 |
| | | → L=L+1 | 6(a) |
| | | Erase words O, L through M, L | 6(b) |
| | | → Write a string on unit I | 7 |
| 9(d) Do | 8(a) Do | | |
| Merge | String | String End | 7(a) |
| (M-1) Times | M Times | Post 1 to word I, L; and add 1 to adder | 7(b) |
| | | I=I−1 (Backward step I Counter) | 8 |
| | | Start merge on Unit I from other units which have strings at level L | 9 |
| | | Merge complete on Unit I | 9(a) |
| | | L=L−1 | 9(b) |
| | | Post contents of adder to word I, L for "merge string count" | 9(c) |
| | | Restore I | 9(e) |

TABLE—Continued

| | | Statement Number |
|---|---|---|
| MACHINE-TEST | If L=0, or | 10 |
| | If any non-zero number posted at level L ≠ number posted in word I, (L−1); this may be done by: | 11 |
| | L=L−1 | 11(1) |
| | fetch to MDR | 11(2) |
| | L=L+1 | 11(3) |
| | compare each non-zero L to I, (L−1) for equality | 11(4) |
| | Then if any ≠, I=I+1, L=L+1, and GO TO ALPHA | 11(a) |
| | If all=, and Direction Switch is OFF, GO TO BETA | 12 |
| | But if all=, and if Direction Switch is ON, GO TO GAMMA | 12(a) |
| BETA | I=I−1 | 13 |
| | Start merge from all units which have strings at level L onto unit I | 13(a) |
| | Accumulate word (I+1), (L−1) with all words at level L; and erase postings at L and (I+1), (L−1). This may be done by: | 13(b) |
| | Add contents of all words at level L | 13(b1) |
| | I=I+1 and L=L−1 | 13(b2) |
| | Add contents of word I, L | 13(b3) |
| | Erase word I, L | 13(b4) |
| | I=I−1 and L=L+1 | 13(b5) |
| | Erase postings at L | 13(b6) |
| | Merge complete on Unit I | 13(c) |
| | L=L−1 | 13(d) |
| | Post accumulated contents into word I, L | 13(e) |
| | I=I+1 | 13(f) |
| | Turn ON Merge Direction Switch, and | 14 |
| | GO TO MACHINE-TEST | 15 |
| GAMMA | Set I=I+1 | 16 |
| | Start merge from all units which have strings at level L onto unit I | 16(a) |
| | Accumulate word (I−1), (L−1) and all words at level L; and erase postings at L and at (I−1), (L−1). This may be done by: | 16(b) |
| | Add contents of all words at level L | 16(b1) |
| | I=I−1 and L=L−1 | 16(b2) |
| | Add contents of word I, L | 16(b3) |
| | Erase word I, L | 16(b4) |
| | I=I+1 and L=L+1 | 16(b5) |
| | Erase postings at L | 16(b6) |
| | Merge complete on Unit I | 16(c) |
| | L=L−1 | 16(d) |
| | Post adder contents into word I, L | 16(e) |
| | I=I−1 | 16(f) |
| | Turn OFF Merge Direction Switch, and | 17 |
| | GO TO MACHINE Test | 18 |

All statements in the above algorithm are coordinated by, and most of the statements are entirely executed by Criss-Cross Sort Control circuits shown in FIGS. 2–9, even though a few of the statements are executed by conventional programs linked by circuits illustrated herein.

The detailed circuits in FIGS. 2–9 representing Criss-Cross Sort Control means 15 will next be described in relation to the statements in this algorithm:

BEGIN ROUTINE-CIRCUITS AND OPERATION (1) Set $I=0$, and $L=0$ (Initiating the Begin routine). Algorithm operation begins in FIG. 2 by actuating an output from an OR circuit 21. In this embodiment, a criss-cross sort job may be started manually by pushing a button 16, or automatically by an output from CPU instruction Unit 10*b*, when the computer system is being job-controlled by a supervisory program, such as the publicly-available IBM OS/360 MFT (Multiprogramming with a Fixed number of Tasks). When under CPU job control, Instruction Unit 10*b* provides an output to OR gate 21, for example, when it decodes a supervisor call (SVC) instruction of a particular type signifying an automatic calling of the next job from the computer input job stream.

Figure 2:
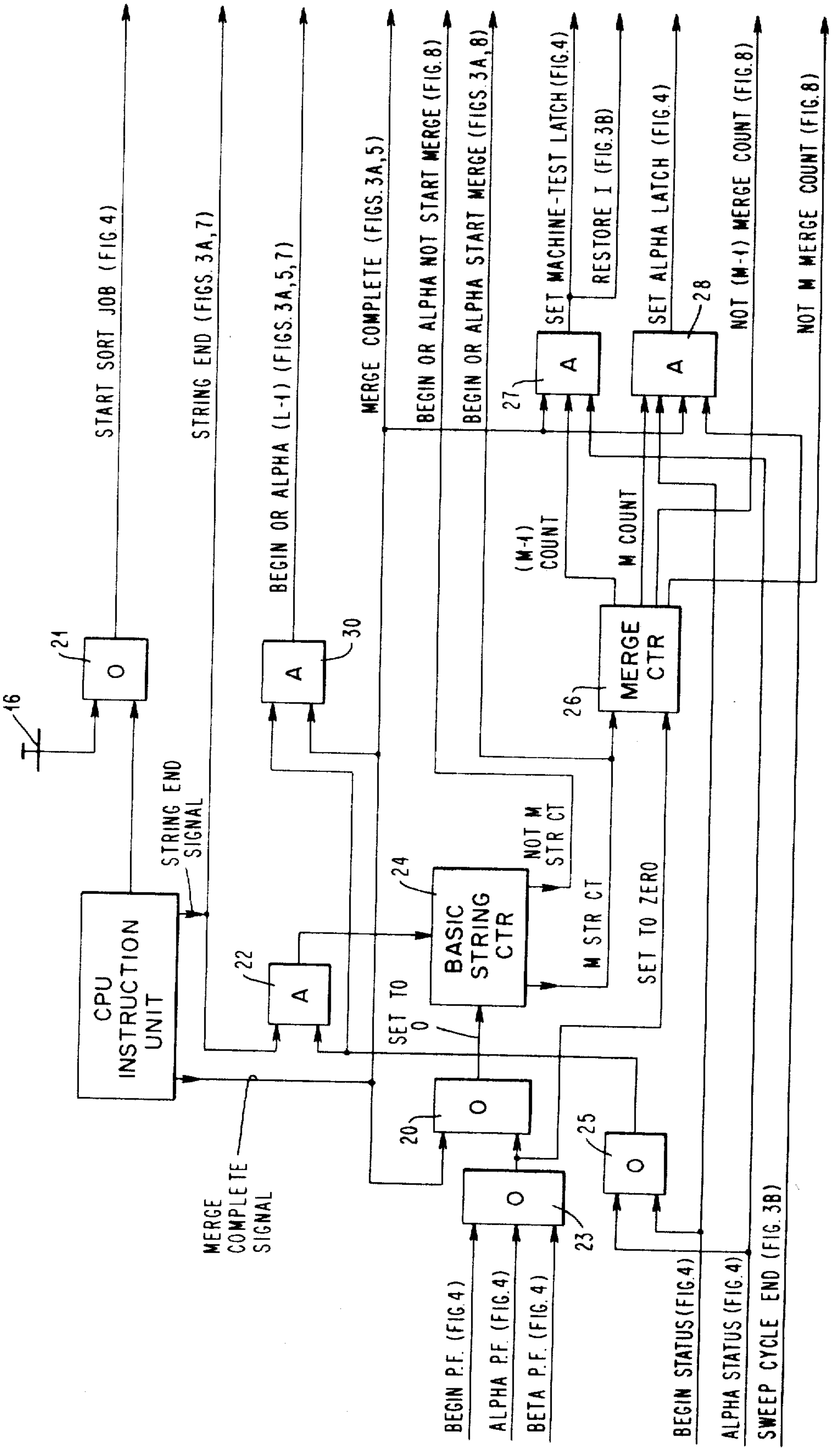
FIG. 2 shows circuitry which enables transfer of control from conventional computer operation to the subject invention embodiment.

A Begin Status latch 71 on FIG. 4 is set by the start sort job signal from OR gate 21 in FIG. 2. While set, latch 71 indicates the existence of the Begin routine. When set its output activates a Begin Status output line to inputs on FIGS. 2, 3A and 8. The setting of latch 71 also triggers a Begin Pulse former (P.F.) 73 to provide a Begin pulse to inputs on FIGS. 2, 3A, 3B and 7.

When Begin Status latch 71 is set, it resets all other Status latches on FIG. 4. On FIG. 4, the input set line to any Status latch resets all of the other Status latches. The Begin routine is permitted to continue only as long as Begin Status Latch 71 is set.

The Begin pulse initiates the next steps in the Begin routine. In FIG. 3B, the Begin Pulse sets to zero an I counter 53 to obtain $I=0$ and sets a Level counter 57 to zero to obtain $L=0$. Thus algorithm step (1) is executed.

(1a) $L=L+1$.

In FIG. 3A, the Begin Pulse passes through OR circuits 48, 49, and 39 to activate the $(L+1)$ line and increment Level Counter 57. Thus algorithm step (1a) is executed.

(1b) Erase Words 0, L through M, L.

The output of OR circuit 48 is provided to FIG. 9 to reset a Trigger 156 to Erase Status. In FIG. 3*b* the output of OR circuit 49 sets a trigger 63 which then provides a Start Sweep Cycle. On FIG. 7 the Erase Sweep Cycle Control circuits are reset when the Begin pulse passes through OR circuits 131 and 126 to set to zero an Adder 119, and a Memory Data Register (MDR) 117; and OR circuit 114 provides a Store MDR signal to a Memory Control 116 that causes MDR 117 to store its all-zero contents in the currently addressed location (Level 0) of Main Memory 11 on FIG. 6.

In FIG. 3B when trigger 63 is set, it causes a single sweep by sweep counter 66 across each output 0–M, which provides every IU address to an Address Summation circuit 62. This causes the Memory Address Register 111 to sequentially address every word at the level pointed to by the current setting of Level counter 57. Also when trigger 63 is set, its ON output enables AND array 61 to pass outputs from Sweep counter 66, and its OFF output disables AND array 59 to block the output from I counter 53. Furthermore the ON output energizes oscillator 64 to provide a sequence of Sweep pulses to FIG. 9 and to the input of counter 66, which causes it to sequentially activate its output lines 0–M. When the last output line M is activated, it provides a Sweep Cycle End Signal that is fed-back to simultaneously reset counter 66 to zero and reset trigger 63 to deenergize oscillator 64 and discontinue its output pulses. When reset, the ON output from latch 63 drops to disable gate array 61, and the OFF output is energized to enable gate array 59 so that the output of I counter 53 may thereafter reach Summation circuit 62.

In FIG. 9, the sequence of N Sweep pulses provided from oscillator 64 is received at inputs to AND gates 157, 159 and 161, of which only gate 159 is enabled during the Begin routine. Gate 157 is disabled by the down condition of the Add output from trigger 156, and gate 161 is disabled because Machine-Test status does not exist during Begin status.

Accordingly, the sequence of N oscillator pulse is provided as Erase pulses from gate 159 on FIG. 9 to OR circuit 131 on FIG. 7. Each of these pulses is simultaneously applied to the set-to-zero input of Adder 119, to the set-to-zero input of MDR 117 through OR circuit 126, and to the store MDR control input of Memory Control 116 through OR circuit 114. MDR 117 then stores its zero state into each of the words sequentially addressed during the 0–M sweep at the level L currently being outputted from counter 57. The storing of all zeros into all words at the current level L completes the execution of algorithm statement 1(*b*).

(2) Writing a String on Unit I.

When Sweep counter 66 reaches its last count position M, it provides a Sweep Cycle End signal through an OR circuit 54 in FIG. 3B which then signals a CPU Interrupt Control line. In FIG. 8, an AND gate 142 is enabled by this CPU Interrupt Control signal since it is conditioned during Begin or Alpha status by an OR circuit 141. The output of gate 142 is provided to both an AND gate 143 and to a Pulse Former (PF) 146. Then PF 146 provides a pulse through an AND gate 145 to the CPU Interrupt line to FIG. 1. This initiates a conventional program interrupt of the computer system, wherein any program that might have been in execution at this time may be interrupted when it reaches an interruptable place. The interrupt causes a branch to the Supervisory Means which stores the contents of registers and other items of the interrupted program needed to later start it at the place where it is interrupted. Gate 145 is conditioned during Begin, Alpha, Beta and Gamma status by the output of a gate 140 which is activated by a Not M Merge Count signal and a Not Machine-Test Status signal.

AND gate 143 has all of its inputs enabled at this time, so that it gates a Set String Order Code signal to a code translator 144 which thereby generates a predetermined String Order Interrupt Code that can be set into the Parameter Passing Register **10*d*1 in FIG. 1. Similarly AND gate 149 is enabled by the CPU Interrupt signal from gate 145 to gate the Selected Unit address from Translator 151 to Parameter Passing Register 10*d*2 in FIG. 1. This program interruption, in combination with these settings of the String Order Interrupt Code of the Selected Unit IU Address into Parameter Passing Registers 10*d*1 and 10*d*2 in FIG. 1, causes the Supervisory Means by conventional technique and with its timing to branch to the String Order means and write an "initial string" of records from the String Order Or Merge Buffer Means in Main Storage 11 onto the selected IU through Memory Control 12 and Channel and I/O Control 13**.

Records are read from Input Unit TA through Channel and I/O Control 14 and Bus and Memory Control 12 into String Order or Merge Buffer means under control of the String Order Means, until the Buffer Means is initially full, and thereafter as space becomes available in the Buffer Means as records are written out into an "initial string." Memory Control 12 conventionally multiplexes the memory operation to permit concurrent operation by both channels 13, 14 and a program means.

AND gate 143 has its other inputs enabled upon receiving each CPU Interrupt Control signal in the Begin or Alpha routines until M string count is reached, which is signaled by the Begin or Alpha Not Start Merge line. The end of the Begin or Alphat routines are signalled to gate 143 by OR circuit 141 which is being actuated by an AND gate 162 during Begin Status and by AND gate 161 during Alpha Status.

Accordingly the String Order Means writes a string on the selected IU which initially will be IU–0, since I counter

53 was initially set to zero by the Begin PF pulse. It may take a while to write the string, depending on its length, which may vary considerably. During this write-out time, the Supervisory Means may concurrently have the CPU and Memory execute some other program such as the X, Y or Z means while waiting for the IU operation to complete. Memory cycles required for the IU transfers are interleaved with the execution of the X, Y or Z Means program in the manner found with commercial computer systems, such as with IBM S/360 using the OS/360-MFT (Multiprogramming with a Fixed number of Tasks) supervisory program. Thus, algorithm statement 2 is executed.

(2a) String End.

When the String Order means has completed writing a string on the selected IU, it will reach an instruction that p ovides an output from CPU Instruction Unit **10*b* to activate the String End line on FIGS. 2, 3A and 7. On FIG. 2, the String End signal increments Basic String counter 24. When it reaches an M count, it provides an output that increments Merge Counter 26. Counters 24 and 26** are initially set to zero by the Begin PF signal from FIG. 4.

(2*b*) Post 1 to Word I, L; and Add 1 to Adder.

In FIG. 7, the String End signal is received by OR circuits 114 and 129, and by 1-circuit 132. The 1-circuit is activated to provide a one digit to both Adder 119 and MDR 117. The output from OR circuit 129 causes the Adder to add the one to its contents, which initially were set to zero. The output from OR circuit 114 activates the store MDR input to Memory Control 116, which causes the MDR content (the digit one) to be stored in the word I, L currently addressed by the Memory Address Register 111 in FIG. 6, due to the current settings of Level counter 57 and I counter 53 in FIG. 3B. Thus a one digit is posted into word I, L, and algorithm statement (2*b*) is executed.

(3) $I=I+1$ (Forward Step I Counter).

In FIG. 3A, the String End signal is provided to AND gate 31, which with the Begin Status provides a ($FWD+1$) signal through an OR gate 34 to increment I counter 53 to the next IU setting.

I counter 53 is set to IU–0 at the start of the Begin routine by the Begin PF 73 in FIG. 4.

(3a) Do String M Times.

The ($FWD+1$) signal generated in subsection 3 passes through OR circuit 54 on FIG. 3B to induce a CPU Interrupt Control signal. This signal is received in FIG. 8 where it operates as explained in prior subsection 2. In summary, the CPU Interrupt signal causes a CPU interrupt, sets the String Order Interrupt Code in Parameter Passing Register **10*d*2, and sets Parameter Passing Register 10*d*1** with the address of the selected IU on which a string is next written by the String Order program.

Also as previously stated in subsection (2a), (2b) and 3, when the String End signal is reached, a 1 is posted to the next word I, L (which is now the current word), a 1 is added to the contents of the Adder 119, and another ($FWD+1$) signal is induced, which selects the next IU and causes a CPU interrupt, resulting in the next string being written. In this manner a different "initial string" is written on each of sequentially selected IU's until Basic String counter 24 in FIG. 2 reaches a count of M, wherein M number of IU's will have "initial strings" but not the Nth IU.

(4) Start Merge on Unit I.

Each M String Count output from counter 24 in FIG. 2 activates its Begin or Alpha Start Merge line to FIGS. 3A and 8, and deactivates its Begin or Alpha Not Start Merge line which deactivates AND gate 143 on FIG. 8 to prevent any String Order Code.

Also each M count increments Merge counter 26 to its next count.

On FIG. 8, a Merge type interrupt occurs when Pulse Formers 146 and 147 are activated by the Begin or Alpha Start Merge signal. Gate 145 generates the CPU Interrupt, and gate 148 provides a Merge Code input to Code Translator 144. The Merge Interrupt Code is therefore available from Translator 144 to Parameter Passing Register 10_d_2. The Supervisory means uses this Register contents to cause a branch to the Merge means; and accordingly, the interrupt forces the computer system to execute the merge program. The first merge combines the strings at the zero level from each of the Intermediate Units 0 through $(M-1)$ onto Intermediate Unit M. Thereby algorithm statement (4) is executed.

(4a) Merge Complete on Unit I.

When this merging operation is completed on any Unit I, it is indicated in FIGS. 1 and 2 by a Merge Complete signal from CPU Instruction Unit 10_b_. This completes the execution of algorithm statement (4a).

The Merge Complete signal from Instruction Unit 10_b_ is provided to OR circuit 20 to set-to-zero the Basic String Counter 24.

(4b) $L=L-1$.

In FIG. 2, AND gate 30 receives the Merge Complete signal and the Begin or Alpha status signals from OR circuit 25 to provide a Begin or Alpha $(L-1)$ signal to FIG. 3A, 5 and 7.

In FIG. 3A, OR circuit 42 receives the Begin or Alpha $(L-1)$ signal to activate the $(L-1)$ line. The $(L-1)$ signal decrements Level counter 57 on FIG. 3B to the next lower level in order to execute algorithm statement (4b).

(4c) Post Adder Contents to Word I, L for "Merge String Count."

The Begin or Alpha $(L-1)$ signal from FIG. 2 is also provided to OR circuit 112 in FIG. 7, which provides an output that causes the contents of Adder 119 to be posted to the word being currently addressed by MAR 111. Accordingly OR circuit 112 activates the Store Adder input of Memory Control 116 to cause the accumulated contents in the Adder 119 to be stored. The word being currently addressed by the Memory Address Register 111, is the word having the current I and L settings of counters 53 and 57.

(4_d_) Do Merge M Times.

The branch-back for reentering the merge loop normally occurs when AND gate 44 is conditioned by the Merge Complete signal from FIG. 2, and the Begin Status from FIG. 4. The gate 44 output initiates algorithm step (1a) to start another merge loop, which continues execution as explained previously in subsection (1a) in response to the CPU interrupt signal from OR circuit 54. The branch-back continues for M number of times, which is indicated by the end of the Not M Merge Count, which drops when M merge count is reached.

Merge counter 26 is incremented by one on each completed merge loop, which is signalled by the M strong count output from Basic String counter 24. The continuance of activated state of the Not M Merge Count output from counter 26 controls the number of merge loops which occur in the Begin routine.

(4e) $L=L+1$ (Break-out of Merge Loop).

A breaking out from the merge loop is controlled by inhibiting the CPU Interrupt signal at M Merge Count. This is done by disabling the CPU Interrupt signal at the M Merge Count during Begin Status.

In more detail, a break-out occurs from the merge loop when the Not M Merge Count signal from FIG. 2 is deactivated by counter 26. This disables gate 162 in FIG. 8. With Gate 142 blocked, it blocks the CPU interrupt attempt at the end of the M Merge loop, and no branch-back can occur.

Also Gate 44 in FIG. 3A is enabled by the Merge Complete signal (which is not affected by M Merge count) to provide an $(L+1)$ signal through OR circuits 48, 49 and 39 to increment the Level counter 57. This executes algorithm statement (4e) in the same manner as statement (1a) was executed.

(4f) Erase words O, L through M, L.

In FIG. 3B, gate 44 also provides a Start Sweep Cycle signal from OR circuit 49 and a Begin or Alpha Erase signal from OR circuit 48 to obtain the same Sweep Erase operation which is terminated with a Sweep Cycle End signal, as was previously explained for algorithm step (1b). However the CPU Interrupt Control signal from OR circuit 54 due to the Sweep Cycle End signal is blocked by gate 142 on FIG. 8 because the Not M Merge Count signal has been dropped at the input to gate 161 during Begin status. Hence no CPU Interrupt signal results from gate 145 to FIG. 1, and no merge-loop branch-back can result. However, this Sweep Cycle End signal links the end of the Begin routine to the start of the Alpha routine.

ALPHA ROUTINE—CIRCUITS AND OPERATION (5) Store I.

In FIG. 2, an M count signal from Merge Counter 26 is provided to an AND gate 28 near the end of the Begin routine. Gate 28 also recevies the Merge Complete signal, the Begin Status signal, and the Sweep Cycle End signal from counter 66 in FIG. 3B. The last of these signals to be received is the Sweep Cycle End signal that ended algorithm statement (4f); and it therefore activates the output of gate 28, which then sets Alpha Latch 74 on FIG. 4 to start the Alpha Status, and resets Begin Latch 71 to end the Begin Status.

Thus the Alpha status signal is actuated and an Alpha Pulse Former (PF) 77 generates a pulse which is received in FIG. 3B by the Store Input to an I Store Gate Control 52, that causes the current setting of counter 53 to be stored within an I Position Store 51. Algorithm step (5) is thereby executed. Store 51 may be a register having N positions corresponding to the positions in counter 53.

The Alpha PF signal is also provided to FIG. 2 where it passes through OR circuits 23 and 20 to set to zero Basic String counter 24 and Merge counter 26.

(6) Turn OFF Merge Direction Switch.

Also, the Alpha PF pulse is sent to FIG. 5 where it is received by the reset input of a Direction Latch 93 to make certain that it is in reset status. Thus its OFF output is active, and its ON output is not active. This executes algorithm statement 6.

(6_a_) $L=L+1$.

Still further, the Alpha PF signal is proviled to FIG. 3A where is passes through OR circuit 48, 49 and 39. The output from circuit 39 operates to increment Level Counter 57, and thereby execute algorithm step (6_a_) in the same manner as step (1_a_) was executed.

(6_b_) Erase words 0, L through M, L.

The outputs of circuits 48 and 49 activate the Start Sweep Cycle signal to FIG. 3B and the Begin or Alpha Erase to FIG. 9 to execute algorithm statement (6b) identically to the execution of statement (1b) as previously explained.

(7) Write a String on Unit I.

The circuits and operation here are identical to that explained in the prior subsection for algorithm step (2). That is, at the end of the Sweep Cycle, the Sweep Cycle End signal passes through OR circuit 54 to cause a CPU Interrupt and a String Order Interrupt Code to FIG. 1, etc.

(7_a_). String End.

The circuits and operation here are identical to that explained in the prior subsection for algorithm step (2_a_), except that in FIG. 2, gate 22 is conditioned by Alpha status rather than Begin status.

(7_b_). Post 1 to Word I, L and Add 1 to Adder.

The circuits and operation here are identical to that explained in the prior subsection for algorithm step (2_b_).

(8) $I=I-1$ (Backward Step I Counter).

THE String End signal is also applied to AND gate 36 on FIG. 3A which is activated by Alpha status to provide a $(BWD-1)$ signal through OR circuit 37 to FIG. 3B to decrement I counter 53 and activate OR circuit 54.

The latter thus induces a CPU Interrupt Control signal to FIG. 8, where it passes through AND gate 142. Gate 142 is now conditioned by the output of gate 161 by the Alpha Status signal, and the Not ($M-1$) Merge Count signal from Merge Counter 26 in FIG. 2.

This causes a string to be written on an IU which has an address of one less than the prior selected IU in the selection sequence among IU's.

(8*a*) Do String M Times.

The CPU interrupt mentioned in subsection 8 causes a branch-back to the beginning of the string loop.

The branch-back operation is identical here to that explained for algorithm step (3*a*), wherein the string writing operation repeats after each String End signal, until strings are written M number of IU's; at which time counter 24 has reached the M string count, and has dropped the Begin or Alpha Not Start Merge line to FIG. 8. On FIG. 8 the dropping of this line blocks AND gate 143 to prevent any CPU Interrupt or String Order Code from being induced from Transistor 144.

(9*a*) Merge complete on Unit I.

The circuits and operation here are identical to that explained in the prior subsection for algorithm step (4*a*).

(9*b*) $L=L-1$.

The circuits and operation here are identical to that explained in the prior subsection for algorithm step (4*b*).

(9*c*) Post Contents of Adder to Word I, L for "Merge String Count."

The circuits and operation here are identical to that explained in the prior subsection for algorithm step (4*c*). The Sweep Cycle End Signal from counter 66 on FIG. 3B ends the execution of this step and is provided to AND gate 27 on FIG. 2 to initiate the Machine-Test status.

(9*d*) Do Merge ($M-1$) Times.

The circuits and operation here are identical to that explained in the prior subsection for algorithm step (4*d*), except for the following: Gate 142 is blocked during the ($M-1$) cycle of the merge loop during Alpha Status, instead of during the M cycle explained for Begin Status in subsection (4*d*). This is done in FIG. 8 by using AND gate 161 instead of 162. Gate 161 is deactivated at the ($M-1$) Merge Count by the dropping of this line from counter 26 in FIG. 2. Gate 162 is not active because of lack of Begin Status. Accordingly no output is provided from OR circuit 141 to gate 142 at ($M-1$) Merge Count during Alpha Status, and the operations do not then branch-back.

(9*e*) Restore I.

After the ($M-1$) count, a Restore I signal is obtained from an AND circuit 27, after it receives the last Merge Complete signal during Alpha Status. The Restore I signal is received in FIG. 3B by the Restore I input of Gate Control 52 which resets I counter 53 to the value of I in Store 51. This may be done by eelctronically copying the contents of Store 51 into I counter 53 using Gate Control 52.

MACHINE-TEST ROUTINE—CIRCUITS AND OPERATION

The Machine-Test Operation is a key element in controlling the Criss-Cross Sort operation. Although initially entered after the first executive of the Alpha routine, it can thereafter be entered after completing any of the Alpha, Beta, or Gamma routines The result of the Machine-Test operation determines which of Alpha, Beta, or Gamma operations will be executed next. The Machine-Test result may be expressed as successful or unsuccessful. If the Machine-Test is not successful, the Alpha routine is reentered. But if the Machine-Test is successful, the Beta or Gamma routine is entered according to whether a Direction Latch 93 in FIG. 5 is OFF or ON, respectively.

In FIG. 4, a Machine-Test Status Latch 78 is set by activation of AND gate 27 in FIG. 2 while it is being conditioned by the Alpha Status line in FIG. 2 and the Merge Complete signal. A pulse Former (PF) 79 provides an output pulse when Beta Status Latch 78 is activated, which resets and prepares a number of circuits for operation of both the Machine-Test and Beta routines.

(10) If $L=0$, Jump to Step (11*a*).

If the setting of Level counter 57 is zero when the Machine-Test routine is entered, then the condition of this algorithm step is met; and execution jumps to algorithm step (11*a*) which is next executed. This is explained in subsection (11*a*) below. Algorithm step (10) is performed by a gate 32 in FIG. 3A as follows: Gate 32 is connected to the Machine-Test Status signal from FIG. 4 also is connected to the Level 0 output line from counter 57 on FIG. 3B through an OR circuit 33 on FIG. 3A. Therefore gate 32 provides an output only if 0 level exists during Machine-Test Status. An output signal from gate 32 is provided to OR circuits 34 and 39, which start the operation of algorithm statement (11*a*), explained later, thereby skipping statements (11) through (11–4), and resulting in a return to the Alpha routine.

(11) Is Any Non-Zero Posting at the Current Level Not Equal to the Posting in Word I at the Next Lower Level?

Algorithm statement (11) is executed as an alternate to statement (10) when Level counter 57 is not at zero level. An Inverter 56 on FIG. 3B receives the level 0 line from counter 57 and provides a Not Level 0 output signal to an AND gate 43 in FIG. 3A, only if the level is other than zero. Thus gate 43 executes statement (11) as the alternative counterpart to gate 32 for statement (10).

(11–1) $L=L-1$.

The output of gate 43 passes through an OR circuit 42 to activate its output line ($L-1$) which decrements Level counter 57. This causes Memory Address Register 111 to drop back one level and address word I, ($L-1$), which now becomes the current word I, L.

(11–2) Fetch to MDR.

The gate 43 output also activates a Machine-Test Reg-1 line to FIGS. 6 and 7. On FIG. 7, an OR circuit 118 passes the Machine-Test Reg-1 signal to activate the Fetch Control Input of Memory Control 116 which causes MDR 117 to fetch the contents of the currently addressed word, which is word I, L. In FIG. 6, a Register Selector 101 also receives the Machine-Test Reg-1 line to set up a transfer path from MDR 117 to a register 102, designated as Reg-1.

(11–3) $L=L+1$.

On FIG. 6, a Reg-1 Set line is activated by register 102 when its contents are set by the fetched word passed through Register Selector 101. The Reg-1 Set signal is passed through OR circuits 49 and 39 on FIG. 3A to increment Level Counter 57 to the next higher level, and to activate a Start Sweep Cycle signal, which sets Sweep Control Trigger 63 to activate oscillator 64.

(11–4) Compare L to Word I, L for Equality.

On FIG. 3B, a gate 67 is activated when Trigger 63 is set to provide a Machine-Test Reg-2 signal to FIGS. 6 and 7 during Machine-Test Status.

The resulting sequence of N sweep pulses from oscillator 64 are provided to FIG. 9 where they are received by AND gates 157, 159 and 161. However only AND gate 161 is activated by the Machine-Test Status signal to provide Compare Pulses to FIGS. 6 and 7. In FIG. 6, Memory Address Register 111 sequentially addresses each of the N number of addresses at the current level L as Sweep Counter 66 in FIG. 3B is synchronously cycled by the same pulses from oscillator 64. In FIG. 7, OR circuit 118 receives these pulses to cause sequentially synchronous fetches to the Memory Data Register 117 of each word at level L, which is from word 0, L through M, L.

In FIG. 6 a gate 105 receives the Machine-Test Reg-2 signal from FIG. 3B and is activated by the Reg-1 Set signal to cause Register Selector 101 to provide a path from MDR 117 into register 103, designated Reg-2, for each of the N fetches controlled by the sweep.

Each time a data transfer into register 103 occurs, the corresponding Compare Pulse is applied to a CPU Compare Means 104 to cause a comparison between each of N words fetched into register 103 and the word earlier fetched into register 102. (Suitable clocking may be provided for each oscillator output pulse to sequence its multiple uses if necessary.) The Not-Equal output of compare means 104 is inactive until a Not-Equal Compare is found. An AND gate 106 is conditioned by each Non-Zero number in Reg-2 to pass any Not-Equal signal provided from Compare Means 104. The Non-Zero signal input to gate 106 may be an O-Ring of all of the effective bit positions in Reg-2 so that if any non-zero bit exists, it provides a signal to enable gate 106 to pass the Not-Equal signal from the Compare Means 104. A Not-Equal Compare trigger 107 has its set input connected to gate 106, so that it will be set by any Not-Equal Compare for non-zero numbers occurring during the sweep cycle. The output state of trigger 107 is tested at the end of the sweep cycle by an AND gate 108, which has its other input conditioned by an AND gate 109 that provides a Machine-Test Compare End output to FIG. 4 when it receives the Sweep Cycle End signal from FIG. 3B during the Machine-Test Status. The Machine-Test≠ output from gate 108 is provided through OR circuit 33 in FIG. 3A to activate AND gate 32, which then provides a Comparison Not Successful output to FIGS. 4 and 5, that results in a return to the Alpha routine.

In summary, AND gate 32 may be activated during Machine-Test Status by either a zero level or a Machine-Test≠ signal from FIG. 6.

The Machine-Test Status Latch 82 on FIG. 4 may be reset by either the Comparison Not Successful signal from FIG. 3A or the Machine-Test Cycle End signal from FIG. 6.

(11*a*) $I=I+1$ and $L=L+1$.

This algorithm statement is entered if the Comparison is Not Successful; and it can be entered from either statement 10 (as previously mentioned) or from statement (11–4). Both entrances are represented by an output from gate 32 in FIG. 3A.

If gate 32 provides an output due to either statement, OR circuit 34 then energizes the $(FWD+1)$ line to increment I counter 53; and the OR circuit 42 then decrements Level counter 57 to the next lower level.

(11*b*) GO TO ALPHA.

If a Comparison Not Successful output is generated by gate 32 on FIG. 3A, it goes to FIG. 5 and sets a Comparison Test trigger 97, which initially was reset by the Beta PF output. When set, Test trigger 97 activates its ON output to an AND gate 91 which is enabled by Machine-Test Status. Gate 91 then provides a Set Alpha Latch signal to set Latch 74 on FIG. 4 and to reset the Machine-Test Status Latch. The circuit operation then branches back to the Alpha routine which proceeds in the manner previously explained with respect to the statements (5) through (9*e*).

(12) If Direction Switch is OFF, GO to BETA.

The Machine-Test is successful if Level Counter 57 was not at zero and if all of the numbers posted in the words at level L were equal to the number posted in the word I, $(L-1)$. Then there is not branch branch to the Alpha routine, but the operation must go to either the Beta or Gamma routines. In this case, Machine-Test trigger 97 in FIG. 5 remains in reset status when algorithm statement (12) is reached, and its OFF output conditions an AND gate 99. Gate 99 is also conditioned by the activation of a Not Machine-Test Status line from FIG. 4, and by the OFF outputs from Direction Latch 93 and Test trigger 97. If these conditions are met, a signal is provided to FIG. 4 to set the Beta Status Latch 78. The Beta routine then starts operating.

(12*a*) If Direction Switch is ON, GO TO GAMMA.

If all of the conditions for algorithm statement (12) are met as described in subsection (12), except for Direction Switch 93 being ON in FIG. 5, then an AND gate 92 is enabled instead of gate 99.

Gamma Latch 84 on FIG. 4 is then set by the output of gate 92. The Gamma routine then starts operating.

BETA ROUTINE—CIRCUITS AND OPERATION

(13) $I=I-1$ (Start Beta routine).

When Beta Status Latch 78 is set, it provides a Beta Status signal to FIGS. 3A, 5 and 9. In FIG. 5, a gate 95 is enabled by the Beta Status output to provide a plurality of outputs, including activating a Beta $(I-1)$ line to OR circuit 37 in FIG. 3A, which decrements I Counter 53 and executes algorithm step 13.

(13*a*) Start Merge onto Unit I.

A Beta Start Merge line from gate 95 in FIG. 5 signals FIG. 8 to cause a CPU interrupt to set the translated Unit I address into Parameter Passing Register **10*d*1 in FIG. 1, and to generate a Merge Interrupt Code (which is sent to Parameter Passing Register 10*d*2 in FIG. 1). Pulse Formers 146 and 147 are actuated by the Beta Start Merge signal to provide outputs through AND gates 145 and 148, which are both conditioned at this time by enabled gate 140. The Merge counter 26 on FIG. 2 was set to zero by the Beta PF output and hence provides a Not M Merge Count signal to gate 140. Gates 148 and 149 are enabled by the output of gate 145** to actuate the Translator outputs for the Merge Interrupt Code and Unit I address to the Parameter Passing Registers in FIG. 1.

(13*b*) Accumulate Posted Word $(I+1)$, $(L-1)$ with the Posted Words at Level L; and Erase Postings for the Accumulated Words.

Adder 119 in FIG. 7 is used to add the contents of the posted words at the current level L to the contents of the word at $(I+1)$, $(L-1)$. The non-zero words at the current level L indicate the last operations of writing merge strings on M number of Intermediate Units as long as input strings from Input Unit TA remain to be written out.

On the other hand if no input strings from Unit TA remain to be written out, then the words at the current level indicate the highest level existing during a final merging process that involves alternately operating through the Beta and Gamma routines.

The word $(I+1)$, $(L-1)$ indicates the number of initial strings existing on the next unit $(I+1)$ in its highest level "merge string," which is at the next lower level $(L-1)$.

This accumulation operation is done in this embodiment using algorithm steps (13b1) through (13b6), as follows:

(13b1) Add Contents of all Words at Level L.

Gate 95 has been activated in the manner discussed in subsection 13. Thus in FIG. 5, gate 95 activates an output line called Beta Add Contents at L. This line is connected to OR circuit 49 in FIG. 3A and to the Set input of Trigger 156 on FIG. 9 to set it to Add status. In FIG. 3A, OR circuit 49 output activates the line, Start Sweep Cycle to FIG. 3B, which sets trigger 63 to start the sweep cycle (previously explained in subsection (4f).

In FIG. 9, gates 154 and 157 are conditioned by the Add status of trigger 156. Gate 157 is also conditioned by the Not Machine-Test Status from FIG. 4. As gate 157 receives the Sweep Pulses from oscillator 64 in FIG. 3B, they are provided as Add Pulses from the output of gate 157 to OR circuits 118 and 129 in FIG. 7. Circuit 118 actuates the fetch operation of memory control 116 to fetch words addressed by Memory Address Register 111, while circuit 129 synchronously actuates the Add operation of Adder 119 through OR circuit 125 to accumulate these fetched words. The Memory Address Register sequentially addresses all words at level L in response to a Start Sweep Cycle signal in the same manner as previously explained in subsection (4f).

Thus a fetch and add operation is caused by the N number of Sweep Pulses as Memory Address Register 111 in FIG. 6 respectively addresses every word in the current level L of the IU String Count Table. A Sweep Cycle End signal from FIG. 3B indicates the end of this sweep adding operation. In FIG. 9, gate 154 receives the Sweep Cycle End signal from FIG. 3B to provide an output that indicates the end of the add operation. Thus all words at the current level L have their contents accumulated within Adder 119 to execute algorithm statement (13b1).

(13b2) $I=I+1$, and $L=L-1$

In FIG. 9, a gate 152 is actuated by the Sweep Add End signal from gate 154 to provide a Beta $(I+1)$ $(L-1)$ output to FIGS. 3A and 7. In FIG. 3A, OR circuits 34 and 42 receive the Beta $(I+1)$ $(L-1)$ output to increment I and to decrement L. The next I, L addressable by MAR 111 therefore is described by the immediately preceding values of I and L with the expression $(I+1)$, $(L-1)$. It therefore represents the execution of this algorithm statement.

(13b3) Add Contents of Word I, L.

The current word I, L is the word resulting from execution of statement (13b2). Memory Address Register 111 always addresses the current word, which is represented by the current setting of I counter 53 and L counter 57, except during a sweep operation.

Algorithm statement (13b3) is also initiated by the output of gate 152 on FIG. 9 labeled Beta$(I+1)$, $(L-1)$ after it is received on FIG. 7 by OR circuits 118 and 123 and AND gate 121. Circuit 118 actuates the Fetch input to Memory Control 116 which places the contents of the current word I, L into MDR 117. A MDR Set signal is provided by MDR 117 when the memory fetched data is set into MDR 117 to condition an AND gate 127 which also receives the output of OR circuit 123. Hence, gate 127 is enabled by the MDR Set signal to provide an output through an OR circuit 125 to actuate the Add input to Adder 119; whereupon Adder 119 accumulates the fetched MDR contents; and algorithm statement (13b3) is executed.

(13b4) Erase Word I, L.

When the accumulation by Adder 119 is completed, it provides an Add Complete signal to an AND gates 124, which is being conditioned by the output from OR circuit 123, to provide an output through an OR circuit 126, which sets to zero the contents of MDR 117 and actuates the Store MDR input to Memory Control 116 to cause the zero MDR contents to be stored into word I, L currently addressed by the Memory Address Register 111 in FIG. 6. This storing of all zeros in word I, L erases it; and this executes algorithm step (13b4).

(13b5) $I=I-1$, and $L=L+1$.

In FIG. 7, the Add Complete output from Adder 119 also actuates AND gate 121 to provide an output labeled Beta $(I-1)$, $)L+1)$. This output is received by OR circuits 37, 38, 39, 41 and 49 on FIG. 3A. Circuit 37 decrements I counter 53, and circuit 38 provides an output through OR circuit 39 that increments L counter 57 to execute algorithm statement (13b5).

(13b6) Erase Postings at L.

The output of OR circuit 49 initiated during algorithm statement (13b5) actuates the Start Sweep Cycle line to FIG. 3B. In FIG. 3B, latch 63 is set to start a sweep cycle. OR circuit 38 also provides an output labeled Beta or Gamma Erase to FIG. 9. In FIG. 9, trigger 156 is set to Erase status by the Beta or Gamma Erase signal to enable gate 159 to pass the Sweep Pulses sent from FIG. 3B by oscillator 164. The Sweep Pulses are labeled Erase Pulses at the output of gate 159. The Erase Pulses are provided to OR circuit 131 on FIG. 7; where they set to zero the Adder 119, set to zero MDR 117 via OR circuit 126, and actuate the Store input to Memory Control 116. This causes MDR 117 to store its all zero contents in each word addressed by Memory Address Register 111 across the current level L as it is synchronously actuated by the output of sweep counter 66. The storing of all-zeros across the current level L is anerasing function that executes algorithm statement (13b6).

(13c) Merge Complete on Unit I.

The merge operation started with algorithm statement (13a) continues simultaneously with the add and erase posting operations executed for statements (13b1) through (13b6). Eventualy the merge is complete. Since I/0 operations generally take much more time than CPU operations, the merge is completed after the add and erase posting operations. When the merge is complete, CPU instruction unit **10*b*** in FIG. 2 provides a Merge Complete signal as previously described in subsection (4a).

(13d) $L=L-1$.

As shown in FIG. 2, the Merge Complete signal is sent to FIGS. 3A and 5. On FIG. 5, a gate 96 is actuated by the Merge Complete signal which is conditioned by the output of gate 95 throughout Beta status. Gate 96 provides an output signal labeled Beta $(L-1)$ to FIGS. 3A and 7. In FIG. 3A, it actuates OR circuit 42, to decrement L counter 57 in FIG. 3B.

The Merge Complete signal is blocked FIG. 3A by gates 44 and 47, which are not conditioned during Beta or Gamma status.

(13e) Post Accumulated Contents into Word I, L.

In FIG. 7, the Beta $(L-1)$ signal is applied to OR circuit 112, which actuates the Store Adder input to Memory Control 116 to cause MDR 117 to store the accumulated contents of Adder 119 into the word currently being addressed by Memory Address Register 111 in FIG. 6, that is at the level just decremented by L counter 57.

(13f) $I=I+1$.

In FIG. 7, a delay circuit 115 receives the Beta $(L-1)$ line from FIG. 5, and provides a signal labeled Beta $(I+1)$ Delayed. The delay of circuit 115 exceeds the memory posting operation for statement (13b) so that I is changed only after the posting operation is completed. In FIG. 3A, the Beta $(I+1)$ Delayed signal actuates OR circuit 34 to increment I counter 53 and thereby execute statement (13f).

(14) Turn ON Merge Direction Switch.

In FIG. 5, the Beta $(I+1)$ Delayed signal sets the Direction latch ON to execute algorithm statement (14).

(15) GO TO MACHINE-TEST.

On FIG. 4, Machine-Test Status Latch 82 is set by the Beta $(I+1)$ Delayed signal from FIG. 7 to initiate the Machine-Test routine, previously described in subsections (10) through (12a).

GAMMA ROUTINE—CIRCUITS AND OPERATION

The Gamma routine is very similar to the Beta routine. The basic functional difference is that the "group merge string" in the Beta routine is written on Intermediate Unit $(I+1)$; while in the Gamma routine it is written on Unit $(I-1)$, where I is the position of the I counter upon entreing either routine.

Different circuit elements are provided for the two routines only to the extent needed to reflect the basic difference.

The Machine-Test routine always makes the decision regarding which of the Alpha, Beta, or Gamma routines will be entered, after the initial pass through the Begin and Alpha routines. The result of the Machine-Test operation is reflected in the settings of a Comparison Test trigger 97, and Direction Latch 93 in FIG. 5.

Test trigger 97 is controlled by operations within the Machine-Test routine, but Direction Latch 93 is controlled by the immediately prior routine to the Machine-Test routine. Latch 93 is OFF if Machine-Test is entered from either the Alpha or Gamma routines, but Latch 93 is ON if Machine-Test is entered from the Beta routine.

Trigger 97 is set ON at the end of Machine-Test if the comparison Test is successful as explained in preceding subsection (11–4). If the Comparison Test is unsuccessful, Test trigger 97 remains reset OFF. Test trigger 97 is set ON at the end of the Machine-Test if counter 57 is not at level zero and if every non-zero number posted at the highest non-zero level L is equal to the number posted at word I, ($L-1$). In this manner Test trigger 97 in FIG. 5 indicates the successful or unsuccessful condition at the end of the Machine-Test.

The ON status of trigger 97 is most controlling, because then the setting of Latch 93 is not examined. Trigger 97 is ON if the Comparison Test is unsuccessful, or if counter 57 is at level zero. Then the operation branches to the Alpha routine. AND gate 91 in FIG. 5 accomplishes this operation. Gate 91 is enabled to set the Alpha latch during Machine-Test Status if Comparison Test trigger 97 is set ON by a Comparison Not Successful signal from FIG. 3A.

The Machine-Test examines the setting of Direction Switch 93 only if Test latch 97 is OFF. Hence if trigger 97 is OFF, gates 92 and 99 are conditioned to examine the output state of Direction Latch 93. If Direction Switch 93 is ON, gate 92 operates to set Gamma Status Latch on FIG. 4. But if the Direction Switch 93 is OFF, gate 99 operates instead to set the Beta Status Latch on FIG. 4.

If the Comparison Not Successful signal is not provided from FIG. 3A, then a Machine-Test Compare End signal is nevertheless provided from the output of an AND gate 109 on FIG. 6 to signal the end of the Machine-Test routine. The timing of these two signals may be critical in the operation of AND gate 91, since it is essential that the ON output of Trigger 97 come up (if it is to come up) before the Machine-Test Status input to gate 91 is dropped. This can be assured by providing a Delay circuit 98 to receive the Machine-Test Status signal provided as an input to gate 91.

(16) Set $I=I+1$.

When the Gamma latch 84 is set by the output of gate 92 in FIG. 5, latch 84 activates its Pulse Former 87 in FIG. 4 to provide three simultaneous outputs. One output is Gamma ($I+1$) which passes through OR circuit 34 in FIG. 3A to increment I counter 53 on FIG. 3B.

(16a) Start Merge From All Units onto Unit I.

The Gamma Start Merge output from the Gamma Pulse Former 87 in FIG. 4 is provided to Pulse Formers 146 and 147 on FIG. 8 to generate a CPU Interrupt signal, a Merge Interrupt Code signal, and an I Address signal of the selected Intermediate Unit ($I+1$) to respective Parameter Passing Registers in CPU 10 in FIG. 1. This starts a merge as explained in subsection (13a).

(16b) Accumulate Postings at Level L and at ($I+1$), ($L-1$), then Erase Accumulated Postings.

This algorithm statement is executed similarly to statement (13a), using many of the same circuits, in the following manner:

(16b1) Add Contents of All Words at Level L.

The third output from the Pulse Former 87 is labeled Gamma Add Contents of L, which passes through OR circuit 49 of FIG. 3A to start sweep cycle by setting latch 63 in FIG. 3B in the same manner as explained in subsection (13b1).

The same Gamma Pulse Former signal sets trigger 156 on FIG. 9 to Add status.

Gate 157 is then energized by the Add status to transmit the Sweep Pulse from Oscillator 64 as Add pulses to FIG. 7, which add the contents of all words at level L to execute algorithm statements (16b1), exactly in the same manner as previously explained in subsection (13b1).

(16b2) $I=I-1$, and $L=L-1$.

At the end of the Add cycle, a Sweep Cycle End signal is provided from FIG. 3B to gate 154, which thereby activates gate 153 that is being conditioned by the Gamma status signal. Gate 153 provides an output labeled a Gamma ($I-1$) ($L-1$) to FIGS. 3A and 7. In FIG. 3A it provides a signal through OR circuits 37 and 42 to decrement I counter 53 and L counter 57 on FIG. 3B.

(16b3) Add Contents of Word I, L.

In FIG. 3A, OR circuit 41 provides a Start Sweep Cycle. In FIG. 7, the same Gamma ($I-1$) ($L-1$) signal activates OR circuits 118 and 123, wherein they operate as explained in subsection (13b3) to cause a memory fetch from each word at level L and to cause it to be accumulated in Adder 119. This executes algorithm statement (16b3).

(16b4) Erase Word I, L.

The operation here is identical to the operation previously explained in subsection (13b4).

(16b5) $I=I+1$, and $L=L+1$.

The Add Complete Signal in FIG. 7 energizes an AND gate 122, which then provides a Gamma ($I+1$) ($L+1$) signal through OR circuits 34 and 38 on FIG. 3A to increment I counter 53 and increment L counter 57 on FIG. 3B.

(16b6) Erase Postings at L.

On FIG. 3A, the Beta or Gamma Erase output from circuit 38 resets trigger 156 on FIG. 9 to Erase status. The Gamma ($I+1$) ($L+1$) signal also passes through OR circuit 41 on FIG. 3B to set latch 63 to signal another Start Sweep Cycle. Algorithm statement (16b5) is thereafter executed in the same manner as previously explained in subsection (16b6).

(16c) Merge Complete on Unit I.

The explanation here is identical to the explanation in prior subsection (13c).

(16d) $L=L-1$.

In FIG. 5, the Merge Complete signal is received by gate 94, which is conditioned by Gamma status and the ON output of the Direction Switch 93 to provide a Gamma ($L-1$) signal to FIGS. 3A and 7. In FIG. 3A, it passes through OR circuit 42 to decrement Level counter 57, and thereby execute this statement (16d).

(16e) Post Adder Contents into Word I, L.

In FIG. 7, the Gamma ($L-1$) signal passes through OR circuit 112 to cause a store-adder memory operation in the same manner as previously explained for circuit 112 in subsection (13d), wherein the contents of Adder 119 are stored in the current word I, L being addressed by MAR 111.

(16f) $I=I-1$.

In FIG. 7, a delay circuit 120 generates a Gamma ($I-1$) Delayed signal which is sent to FIGS. 3A, 4 and 5. One FIG. 3A, this signal passes through OR circuit 37 to decrement I counter 53 to complete the execution of algorithm statement (16f).

(17) Turn OFF Merge Direction Switch.

On FIG. 5, the Gamma ($I-1$) Delayed signal resets Direction switch 93 to complete the execution of algorithm statement 17.

(18) GO TO MACHINE-TEST.

The Gamma ($I-1$) Delayed signal is also received on FIG. 4 where it sets Machine-Test Status latch 82.

The Machine-Test routine then starts, and the Machine-Test routine operation previously explained in subsection (10)-(12*a*) is repeated.

TERMINATION OF SORTING

The Criss-Cross sort will end with a single string of all records provided from one or more input units, such as TA in FIG. 1. This single string will be on the last Intermediate Unit specified by I counter 53 for the last "group merge string." The last routine will be either a Beta or Gamma routine. All "initial strings" are written on I/O extents by one use of the Begin routine and Alpha routine. The Beta and Gamma routines are used for "group merging" the "merge strings" resulting from the Begin and Alpha routines to complete the merging which results in a single final string on one I Unit.

This final string can then be used directly from the I/O extent last specified by the I counter by making this last counter setting available. On the other hand, the final string may be transferred to an Output Unit TB in FIG. 1, if required.

EXAMPLE OF CRISS-CROSS SORT

An example is next given of the distribution of "initial strings" into "merge strings" and "group merge strings." The example uses five (N=5) Intermediate Units (IU-0 through IU-4). Each number listed under an IU represents an individual string, and the value of the digit represents the number of "initial strings" combined into the single string represented by that digit.

The position of I denotes the value of I at a given time. The initial state of I is:

| | | | | |
|---|---|---|---|---|
| I | | | | |
| IU-0 | IU-1 | IU-2 | IU-3 | IU-4 |

While executing the Begin routine, the strings are distributed as follows:

| | | | | |
|---|---|---|---|---|
| | | | | I |
| IU0 | IU1 | IU2 | IU3 | IU4 |
| 1 | 1 | 1 | 1 | |

| | | | | |
|---|---|---|---|---|
| | | | | I |
| IU0 | IU1 | IU2 | IU3 | IU4 |
| | | | | 4 |

| | | | | |
|---|---|---|---|---|
| | | | I | |
| IU0 | IU1 | IU2 | IU3 | IU4 |
| | | | | 4 |
| 1 | 1 | 1 | | 1 |

| | | | | |
|---|---|---|---|---|
| | | | I | |
| IU0 | IU1 | IU2 | IU3 | IU4 |
| | | | 4 | 4 |

The distribution at the end of the Begin routine is:

| | | | | |
|---|---|---|---|---|
| | I | | | |
| IU0 | IU1 | IU2 | IU3 | IU4 |
| | 4 | 4 | 4 | 4 |

While executing the Alpha routine, the stored I value is represented by SI, and the I (or J) distribution changes direction follows:

| | | | | |
|---|---|---|---|---|
| | SI | I | | |
| IU0 | IU1 | IU2 | IU3 | IU4 |
| | 4 | 4 | 4 | 4 |
| 1 | 1 | | 1 | 1 |

| | | | | |
|---|---|---|---|---|
| | SI | I | | |
| IU0 | IU1 | IU2 | IU3 | IU4 |
| | 4 | 4 | 4 | 4 |
| | | 4 | | |

| | | | | |
|---|---|---|---|---|
| | SI | | I | |
| IU0 | IU1 | IU2 | IU3 | IU4 |
| | 4 | 4 | 4 | 4 |
| | | 4 | | |
| 1 | 1 | 1 | | 1 |

| | | | | |
|---|---|---|---|---|
| | SI | | I | |
| IU0 | IU1 | IU2 | IU3 | IU4 |
| | 4 | 4 | 4 | 4 |
| | | 4 | 4 | |

| | | | | |
|---|---|---|---|---|
| | SI | | | I |
| IU0 | IU1 | IU2 | IU3 | IU4 |
| | 4 | 4 | 4 | 4 |
| | | 4 | 4 | 4 |

The Machine-Test routine is now executed, followed by execution of Beta routine, then back to the Machine-Test routine which is unsuccessful, and therefore back to the Alpha routine.

| | | | | |
|---|---|---|---|---|
| | SI | | | I |
| IU0 | IU1 | IU2 | IU3 | IU4 |
| 16 | | 4 | 4 | 4 |

Continuing in this manner until arrival at the following distribution:

| | | | | |
|---|---|---|---|---|
| | | | I | |
| IU0 | IU1 | IU2 | IU3 | IU4 |
| 256 | 256 | 256 | 256 | |
| 256 | 256 | | 64 | |
| 64 | 64 | | 16 | |
| 16 | 16 | | 4 | |
| 4 | | | | 4 |

The next four strings would be placed on Intermediate Units 0, 4, 3, and 2; then a series of five merge passes would occur. The direction of the merge is governed by the setting of a Merge Direction Switch.

| | | | | |
|---|---|---|---|---|
| | | | I | |
| IU0 | IU1 | IU2 | IU3 | IU4 |
| 256 | 256 | 256 | 256 | |
| 256 | 256 | | 64 | |
| 64 | 64 | | 16 | |
| 16 | 16 | | 4 | |
| 4 | | | | 4 |
| 1 | | 1 | 1 | 1 |

| | | | | |
|---|---|---|---|---|
| | | | I | |
| IU0 | IU1 | IU2 | IU3 | IU4 |
| 256 | 256 | 256 | 256 | |
| 256 | 256 | | 64 | |
| 64 | 64 | | 16 | |
| 16 | 16 | | 4 | |
| 4 | 4 | | | 4 |

| | | | | |
|---|---|---|---|---|
| | | | I | |
| IU0 | IU1 | IU2 | IU3 | IU4 |
| 256 | 256 | 256 | 256 | |
| 256 | 256 | | 64 | |
| 64 | 64 | | 16 | |
| 16 | 16 | 16 | | |

| | | | | |
|---|---|---|---|---|
| | | | I | |
| IU0 | IU1 | IU2 | IU3 | IU4 |
| 256 | 256 | 256 | 256 | |
| 256 | 256 | | 64 | |
| 64 | 64 | | | 64 |

| | | | | |
|---|---|---|---|---|
| | | | I | |
| IU0 | IU1 | IU2 | IU3 | IU4 |
| 256 | 256 | 256 | 256 | |
| 256 | 256 | 256 | | |

| | | | | |
|---|---|---|---|---|
| | | | I | |
| IU0 | IU1 | IU2 | IU3 | IU4 |
| 256 | 256 | 256 | | 1024 |

If an end-of-file condition for the file providing input strings now exists, the strings on Intermediate Units 0, 1, 2, and 4 would be merged onto the output device.

While the invention has been particularly shown and described with reference to a preferred embodiment thereof, it will be understood by those skilled in the art that the foregoing and other changes in form and details may be made therein without departing from the spirit and scope of the invention.

I claim:

1. In a machine-sorting method using a computer system having at least N number of individually selectable input/output extents, comprising the steps of:
   - machine-writing a different merge string respectively on each of $(N-1)$ of said extents, but not on an Nth of said extents, to obtain an initial level of merge strings on said $(N-1)$ extents,
   - a next-level machine-writing of $(N-2)$ different merge strings on $(N-2)$ of said extents, except on the remaining two of said extents, to obtain a next-level of merge strings, said remaining two extents being the Nth extent of the initial level and one of the extents adjacent to the Nth extent in a selection order for writing on said extents.

2. A machine-testing sequence used with the method of claim 1, including the step of:

setting a merge-direction switch to a first state during each execution of said next level machine-writing step.

3. A machine-testing method for use with the method of claim 1, including the steps of:

recording a machine-readable indication of the number of initial-strings combined within each merge string actively existing at each level, machine-checking said machine-readable indications for any inequality among the indications representing every merge string at the last written level and the indication representing the merge string at the next lower level that does not have a higher-level merge string, and setting a second switch to indicate the equality of inequality found during said machine-checking step.

4. A machine-testing method for use with the method of claim 3, including the step of:

repeating said next-level machine-writing step by writing a different merge string on each of (N−2) of said extents to generate another level of merge strings in response to said second switch being set to indicate an inequality.

5. Within the machine-sorting method defined in claim 4, including the step of:

repeating said next level machine-writing of $(N-2)$ different merge strings in response to all active recorded machine-readable indications being at the initial level.

6. In a machine-sorting method using the machine-testing method of claim 5, including the step of:

machine-reading the highest-level merge string written on each of (N−1) of said extents in response to said second switch indicating an equality, machine-merging said merge strings being machine-read into a group-merge string, and machine-writing said group-merge string on an Nth remaining one of said extents not being machine-read.

7. With the machine-sorting method of claim 6, including the step of:

machine-selecting said Nth remaining extent for said machine-writing step in dependence upon the state of said merge-direction switch.

8. With the machine-sorting method of claim 7, comprising the steps of:

machine-examining the state of said second switch for an indication of equality, and group-merging the highest-level merge strings from all of $(N-1)$ of said extents having merge strings at the two highest levels by writing a resulting group-merge string onto an Nth one of said extents having no string at the two highest levels.

9. With the machine-sorting method of claim 4, including the steps of:

controlling an extent-selection means to indicate the addresses of the extents in a predetermined order, and shifting said extent-selection means to indicate a next extent in said order before repeating the next-level machine-writing step.

10. With the machine-sorting method defined in claim 6, including the steps of:

controlling an extent-selection indicator to the next extent in a predetermined order, shifting said predetermined extent-selection indicator to the next extent in said order before repeating said next-level machine-writing step, and selecting as the Nth extent the adjacent higher or lower extent in said predetermined order according to the setting of said second switch.

11. Within the machine-sorting method defined in claim 10, including the step of:

selecting the upper adjacent extent if said second switch is on, and selecting the lower adjacent extent if said second switch is off.

12. With the machine-sorting method of claim 11, including the steps of:

recording the number of initial sequences in each initial-string, merge string, and group-merge string in relation to their respective levels, selecting each next extent in the predetermined order for a merge operation, machine-reading the highest level string from each of $(N-2)$ extents having strings at the highest current level and the string on another extent having its highest string at the next lower level when all of these strings have equal recorded numbers of initial sequences, merging said strings being machine-read into a group-merge string, and machine-writing said group-merge string on the remaining extent of the N extents not being machine-read.

13. Within the machine-sorting method defined in claim 12, including the step of:

continuing the execution of said preceding steps until an end-of-file is reached for records being sorted, selecting a required extent for receiving a final sorted string, reading and merging a last set of group merge strings into the final sorted string, and writing said final sorted string onto said required extent.

14. A method for sorting unordered and partially unordered records into a more orderly arrangement consisting of the steps of:

writing an initial-string on each of $(N-1)$ input/output means selected in a predetermined order, combining said strings into a merge string, and writing the merge string onto a remaining Nth input/output means, repeating the initial-string writing operation in the same order beginning with the last selected input/output means on which was written a merge string, wherein the beginning input/output means changes for each consecutive execution of said repeating step, leaving each merge string on a different Nth input/output means, repeating said prior steps until a merge string appears on each of said previously specified input/output means except on an Nth means, writing another initial-string on each of $(N-2)$ of said input/output means starting with the means last written with a merge string, and selecting said means in the opposite sequence from said predetermined order, merging said last set of initial-strings onto the input/output means following the prior selected $(N-2)$ means in said opposite sequence, repeating said prior two steps until a merge string is written on each of $(N-2)$ input/output means, and merging said last written $(N-2)$ merge strings and the merge string on another of said input/output means onto the remaining one of said input/output means.

15. In a sorting method for use in a computer system having a plurality of individually selectable input/output units, and a computer system capable of providing initial-strings of records on command to selected units, comprising the steps of:

machine-writing a plurality of initial-strings respectively on said plurality of units except for one unit, and merging said strings on said one unit by recording a merge string thereon, repeating said machine-writing and merging steps in a predetermined order until an initial-level merge string is recorded on every unit of said plurality except one unit, setting a unit-selector indicator to said one unit, a further repetition of said machine-writing and merging steps in an opposite order of selection of said units until a next-level merge string is recorded on every unit except said one unit and another unit adjacent to said one unit in said predetermined order, resetting a merge-direction switch that controls later selection of units for recording group-merge strings, group-merging the highest level strings from said another unit and from said $(N-2)$ units to generate a group-merge string, recording said group-merge string on said one unit, machine-counting the initial-strings included within each merge string and each group-merge string, and recording an initial-string count indicator for each string of any type written on each of said units, machine-testing said initial-string-count indicators to determine if the next machine operation is a repeating of said further repetition step, recording a group-merge string on a unit determined by the setting of said merge-direction switch in relation to the setting of said unit-selector indicator, and controlling the state of said group-merge switch while writing a group-merge string.

16. In a sorting means used with a computer system having at least N number of individually selectable input/output extents, comprising:

means for controlling a machine-writing of a different merge string respectively on each of $(N-1)$ of said extents, but not on an Nth of said extents to obtain an initial level of merge strings on said $(N-1)$ extents, and means for controlling a next-level machine-writing of $(N-2)$ different merge strings on $(N-2)$ of said extents, except on the remaining two of said extents, to obtain a next-level of merge strings, said remaining two extents being the Nth extent of the initial level and one of the extents adjacent to the Nth extent in a selection order for writing on said extents.

17. A machine-testing means used with the sorting means of claim 16, including:

a merge-direction switch set to a first state during each operation of said next-level machine-writing controlling means.

18. A machine-testing means for use with the sorting means of claim 16, including:

means for controlling a recording of a machine-readable indication of the number of initial-strings combined within each merge string actively existing at each level, means for machine-checking said machine-readable indications for any inequality among the indications representing every merge string at the last written level and the indication representing the merge string at the next lower level that does not have a higher-level merge string, and a second switch being settable to indicate the equality or inequality found during said machine-checking step.

19. A machine-testing means for use with the sorting means of claim 18, including:

means for repeating the operation of said next-level machine-writing means by controlling the writing of a different merge string on each of $(N-2)$ of said extents to generate another level of merge strings in response to said second switch being set to indicate an inequality.

20. Within the machine-sorting means defined in claim 19, including:

means for repeating said next-level machine-writing of $(N-2)$ different merge strings in response to all recorded machine-readable indications being at the initial level.

21. In a machine-sorting means using the machine-testing method of claim 20, including:

means for signalling a machine-reading of the highest-level merge string written on each of $(N-1)$ of said extents in response to said second switch indicating an equality, means for controlling the machine-merging of said merge strings being machine-read into a group-merge string, and means for signalling a machine-writing of said group-merge string on an Nth remaining one of said extents not being machine-read.

22. With the machine-sorting means of claim 21, including:

means for machine-selecting said Nth remaining extent for said machine-writing means in dependence upon the state of said merge-direction switch.

23. With the machine-sorting means of claim 22, comprising:

means for machine-examining the state of said second switch for an indication of equality, and means for signalling a group-merging of the highest-level merge strings from all of $(N-1)$ of said extents having merge strings at the two highest levels by writing a resulting group-merge string onto an Nth one of said extents having no strings at the two highest levels.

24. With the machine-sorting means of claim 19, including:

means for controlling an extent-selection means to indicate the addresses of the extents in a predetermined order, and means for shifting said extent-selection means to indicate a next extent in said order before repeating the operation of the next-level machine-writing means.

25. With the machine-sorting means defined in claim 21, including:

means for controlling an extent-selection means to the next extent in a predetermined order, means for shifting said predetermined extent-selection means to indicate the next extent in said order before repeating the operation of said next-level machine writing means, and means for selecting as the Nth extent the adjacent higher or lower extent in said predetermined order according to the setting of said second switch.

26. Within the machine-sorting means defined in claim 25, including:

means for selecting the upper adjacent extent if said second switch is on, and means for selecting the lower adjacent extent if said second switch is off.

27. With the machine-sorting means of claim 26, including:

means for signalling a recording of the number of initial sequences in each initial-string, merge string, and group-merge string in relation to their respective levels, means for selecting each next extent in the predetermined order for a merge operation, means for signalling a machine-reading of the highest level string from each of $(N-2)$ extents having strings at the highest current level and the string on another extent having its highest string at the next lower level when all of these strings have equal recorded numbers of initial sequences, means for signalling a merging of said strings being machine-read into a group-merge string, and means for signalling a machine-writing of said group-merge string on the remaining extent of the N extents not being machine-read.

28. Within the machine-sorting means defined in claim 27, including:

means for continuing the operation of said preceding means until an end-of-file is reached for records being sorted, means for selecting a required extent for receiving a final sorted string, means for signalling a reading and merging of a last set of group merge strings into the final sorted string, and means for signalling a writing of said final sorted string onto said required extent.

29. A means for sorting unordered and partially unordered records into a more orderly arrangement comprising:

means for signalling a writing of an initial-string on each of ($N-1$) input/output means selected in a predetermined order, means for combining said strings into a merge string, and means for signalling the writing of the merge string onto a remaining Nth input/output means, means for repeating the operation of the initial-string writing means in the same order beginning with the last selected input/output means on which was written a merge string, wherein the beginning input/output means changes for each consecutive execution of said repeating step, leaving each merge string on a different Nth inputo/utput means, means for repeating the operation of all said prior-mentioned means by moving to a different Nth input/output means until a merge string appears on each of said previously specified input/output means except on a final Nth means, means for signalling a writing of another initial-string on each of ($N-2$) of said input/output means starting with the final Nth input/output means, and means for selecting each input/output means in the opposite sequence from said predetermined order, means for signalling a merging of said last set of initial-strings onto an Nth input/output means, means for repeating the operation of said prior two signalling means until a merge string is written on each of ($N-2$) input/output means, and means for signalling the merging of said last written ($N-2$) merge strings and the merge string on another of said input/output means onto said final Nth input/output means.

30. In a sorting means for use in a computer system having a plurality of individually selectable input/output units, and said computer system being capable of providing initial-strings of records on command to selected units, comprising:

means for controlling a machine-writing of a plurality of initial-strings respectively on said plurality of units except for one unit, and means for controlling a merging of said strings on said one unit by recording, a merge string thereon, means for repeating the operation of said means for controlling the machine-writing means and merging means in a predetermined order until an initial-level merge string is recorded on every unit of said plurality except one unit, means for setting a unit selector indicator to said one unit, means for controlling a further operation of said means for machine-writing and means for merging in an opposite order of selection of said units until a next-level merge string is recorded on every unit except said one unit and another unit adjacent to said one unit in said predetermined order, means for resetting a merge-direction switch that controls later selection of units for recording group-merge strings, means for controlling a group-merging of the highest level strings from said another unit and from said ($N-2$) units to generate a group-merge string, means for controlling a recording of said group-merge string on said one unit, means for machine-counting the initial-strings included within each merge string and each group-merge string, and means for controlling the recording of an initial-string count indicator for each string of any type written on each of said units, means for machine-testing said initial-string-count indicators to determine if a next machine operation is an operation of said means for controlling a further operation, means for controlling a recording of a group-merge string on a unit determined by the setting of said merge-direction switch in relation to the setting of said unit-selector indicator, and means for controlling the state of said group-merge switch while writing a group-merge string.

References Cited

UNITED STATES PATENTS

| | | | |
|---|---|---|---|
| 3,242,466 | 3/1966 | Dirks | 340—172.5 |
| 3,380,029 | 4/1969 | Goetz | 340—172.5 |

PAUL J. HENON, Primary Examiner
R. F. CHAPURAN, Assistant Examiner